(12) United States Patent
Nakane

(10) Patent No.: US 11,579,376 B2
(45) Date of Patent: Feb. 14, 2023

(54) CLEANING TOOL

(71) Applicant: Fujikura Ltd., Tokyo (JP)

(72) Inventor: Junichi Nakane, Chiba (JP)

(73) Assignee: Fujikura Ltd., Tokyo (JP)

( * ) Notice: Subject to any disclaimer, the term of this patent is extended or adjusted under 35 U.S.C. 154(b) by 398 days.

(21) Appl. No.: 16/634,936

(22) PCT Filed: May 31, 2018

(86) PCT No.: PCT/JP2018/020950
§ 371 (c)(1),
(2) Date: Jan. 29, 2020

(87) PCT Pub. No.: WO2019/049441
PCT Pub. Date: Mar. 14, 2019

(65) Prior Publication Data
US 2020/0166714 A1 May 28, 2020

(30) Foreign Application Priority Data

Sep. 7, 2017 (JP) ............................. JP2017-172028
Sep. 7, 2017 (JP) ............................. JP2017-172037

(51) Int. Cl.
*G02B 6/38* (2006.01)
*B08B 9/00* (2006.01)
(52) U.S. Cl.
CPC .............. *G02B 6/3866* (2013.01); *B08B 9/00* (2013.01); *G02B 6/3825* (2013.01)
(58) Field of Classification Search
CPC ....................................................... G02B 6/38
(Continued)

(56) References Cited

U.S. PATENT DOCUMENTS 6,853,794 B2 * 2/2005 Lu .................. G02B 6/3866
 134/184
8,418,305 B2 4/2013 Fujiwara
(Continued)

FOREIGN PATENT DOCUMENTS

CN 101981480 A 2/2011
CN 103299225 A 9/2013
(Continued)

OTHER PUBLICATIONS

Office Action issued in corresponding Chinese Patent Application No. 201880042589.8, dated Nov. 30, 2020 (6 pages).

*Primary Examiner* — Kaveh C Kianni
(74) *Attorney, Agent, or Firm* — Osha Bergman Watanabe & Burton LLP

(57) ABSTRACT

A cleaning tool includes a tool body and an extension part that extends from the tool body and that includes: a head that presses a cleaning element onto a cleaning target on a pressing surface; an inner guide part through which the head is inserted; and an outer guide part through which the inner guide part is inserted. When cleaning a first optical connector, an outer peripheral portion of the outer guide part guides the head with respect to a ferrule endface of the first optical connector. When cleaning a second optical connector that includes a housing having a different shape from a shape of a housing of the first optical connector, the outer guide part retracts and the inner guide part is exposed toward the second optical connector.

15 Claims, 17 Drawing Sheets

(58) Field of Classification Search
USPC .......................................................... 385/92
See application file for complete search history.

(56) References Cited

U.S. PATENT DOCUMENTS

| | | |
|---|---|---|
| 2004/0086232 A1 | 5/2004 | Fujiwara et al. |
| 2011/0047731 A1 | 3/2011 | Sugita et al. |
| 2015/0107036 A1 | 4/2015 | Lee |
| 2015/0362680 A1* | 12/2015 | Nakane ..................... B08B 1/00 15/105 |

FOREIGN PATENT DOCUMENTS

| | | | | |
|---|---|---|---|---|
| CN | 104056793 A | | 9/2014 | |
| CN | 105122108 A | | 12/2015 | |
| JP | H0968623 A | | 3/1997 | |
| JP | H10260335 A | * | 9/1998 | |
| JP | 2004271766 A | * | 9/2004 | ............... B08B 1/00 |
| JP | 2004326054 A | * | 11/2004 | ............... B08B 1/00 |
| JP | 2004347792 A | | 12/2004 | |
| JP | 2008003302 A | * | 1/2008 | |
| JP | 2010-266675 A | | 11/2010 | |
| JP | 4579330 B2 | | 11/2010 | |
| JP | 4779049 B2 | | 9/2011 | |
| JP | 5178626 B2 | | 4/2013 | |
| JP | 2014206733 A | | 10/2014 | |
| JP | 2017021194 A | | 1/2017 | |
| TW | 201516506 A | | 5/2015 | |
| WO | 2004073896 A2 | | 9/2004 | |
| WO | 2009119437 A1 | | 10/2009 | |
| WO | 2017051759 A1 | | 3/2017 | |

\* cited by examiner

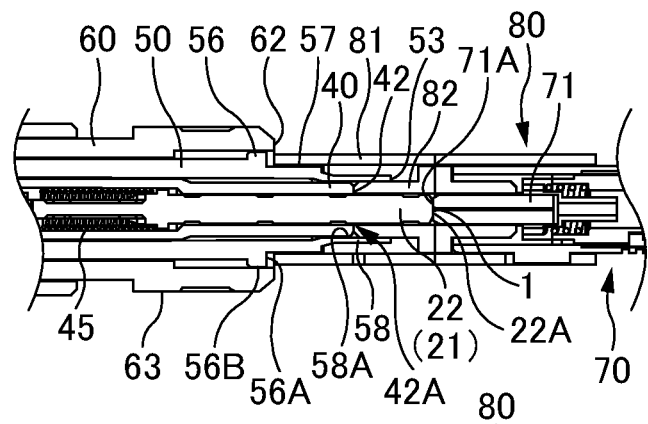
FIG. 17A
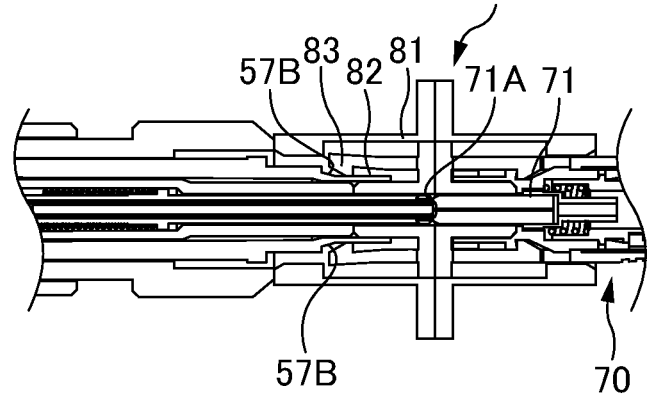
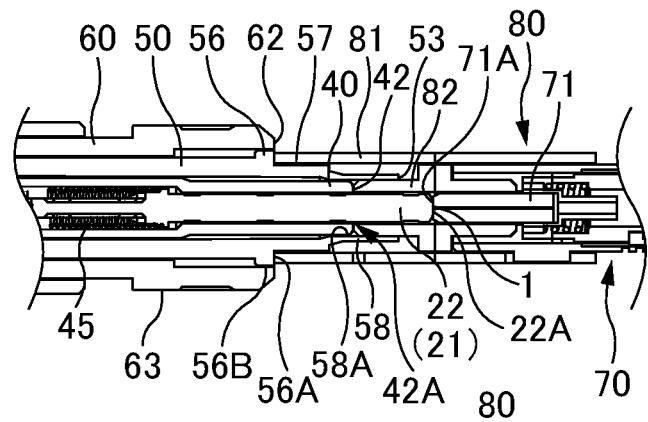
FIG. 17B
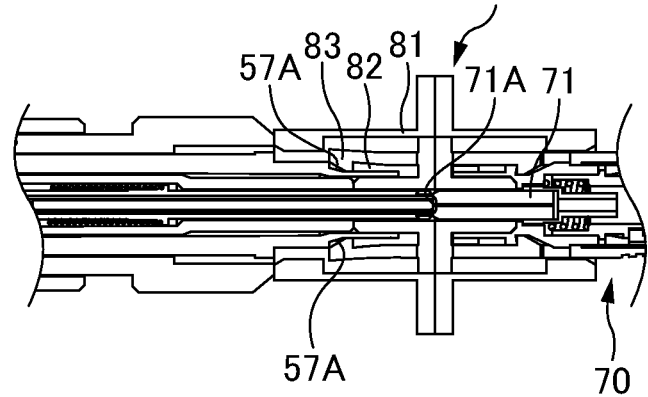

CLEANING TOOL

TECHNICAL FIELD

The present invention relates to a cleaning tool.

BACKGROUND

Connection of optical connectors is achieved by causing optical fiber end-faces at joining end faces of respective optical connectors (ferrule endfaces) to come into abutment with each other. If any of the joining end faces of the optical connectors or the optical fiber end-faces is contaminated, the contamination may cause damage to the optical connector(s) and the optical fiber(s), and increase in transmission loss, for example. Therefore, prior to such abutment connection, the joining end faces of the optical connectors need to be cleaned.

As a cleaning tool, for example, Patent Literature 1 and Patent Literature 2 describe a cleaning tool including a tool body, and an insertion portion (corresponding to an extension part to be described later) including a head member that presses a cleaning element onto a joining end face of an optical connector. According to the cleaning tool, when the tool body is moved with respect to the insertion portion in a state in which the cleaning element is pressed onto the optical connector, the cleaning element is supplied and collected, and the head member is rotated so that the joining end face of the optical connector can be wiped with the cleaning element. In the cleaning tool described in Patent Literature 1 and Patent Literature 2, when the insertion portion extending from the tool body is inserted into an optical adapter (or an optical connector receptacle), a ferrule endface inside the optical adapter can be cleaned. In addition, when an attachment including a guide is attached to the insertion portion, a ferrule endface of an optical plug can be cleaned as well.

PATENT LITERATURE

Patent Literature 1: JP 4579330B
Patent Literature 2: JP 4779049B

In the cleaning tool described in Patent Literature 1 and Patent Literature 2, the insertion portion of the cleaning tool is formed to be positioned when the insertion portion is inserted into a connector housing hole of the optical adapter (optical connector receptacle), at the time of cleaning a ferrule endface inside the optical adapter (optical connector receptacle), for example. Further, owing to a configuration that the insertion portion is formed to be attachable and removable and is also formed to have a shape according to the shape of the connector housing hole of the optical adapter (optical connector receptacle), a ferrule endface inside a plurality of types of optical adapters (optical connector receptacles) can be cleaned. However, such a configuration requires removing an insertion portion and attaching a different insertion portion, depending on a type of an optical adapter (optical connector receptacle) to be used. Therefore, operation efficiency of the entire cleaning operation may be reduced, due to the time and effort for the operation of attaching or removing the insertion portion.

SUMMARY

One or more embodiments of the present invention provide a cleaning tool for an optical connector that can easily clean a ferrule endface inside optical connector receptacles having different shapes of housings.

One or more embodiments of the present invention provide a cleaning tool comprising: a tool body; and an extension part that extends from the tool body, the extension part including a head that presses a cleaning element onto a cleaning target on a pressing surface, wherein the extension part includes an inner guide part through which the head is inserted, and an outer guide part through which the inner guide part is inserted, in a case of cleaning of a first optical connector, an outer peripheral portion of the outer guide part guides the head with respect to a ferrule endface of the first optical connector, and in a case of cleaning of a second optical connector provided with a housing having a different shape from a shape of a housing of the first optical connector, the outer guide part retracts and the inner guide part is exposed toward the second optical connector, so that an outer peripheral portion of the inner guide part guides the head with respect to a ferrule endface of the second optical connector.

Other features of the present invention are made clear by the following description and the drawings.

With some embodiments of the present invention, the ferrule endface inside optical connector receptacles having different shapes of housings can be easily cleaned.

BRIEF DESCRIPTION OF THE DRAWINGS

FIG. 17A and FIG. 17B are each a cross-sectional view illustrating a state of the cleaning tool 10 according to one or more embodiments at the time of cleaning the optical adapter 80 (state after the cleaning element 1 is pressed onto the ferrule endface 71A).

DETAILED DESCRIPTION

Figure 1:
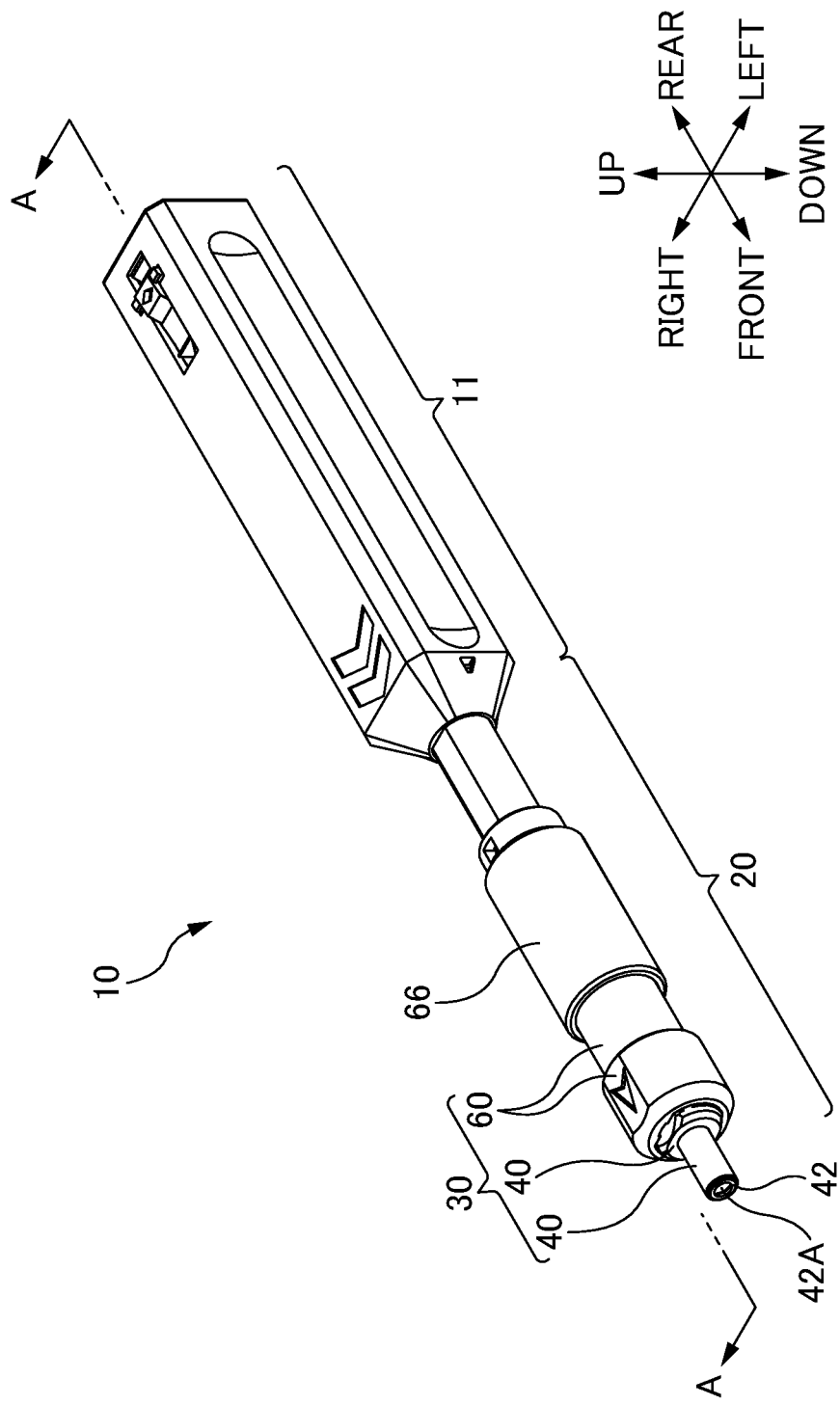
FIG. 1 is an overall perspective view of a cleaning tool 10 according to one or more embodiments.

At least the following matters are made clear from the following description and the drawings.

(1) A cleaning tool will become clear comprising: a tool body; and an extension part that extends from the tool body, the extension part including a head that presses a cleaning element onto a cleaning target on a pressing surface, wherein the extension part includes an inner guide part through which the head is inserted, and an outer guide part through which the inner guide part is inserted, in a case of cleaning of a first optical connector, an outer peripheral portion of the outer guide part guides the head with respect to a ferrule endface of the first optical connector, and in a case of cleaning of a second optical connector provided with a housing having a different shape from a shape of a housing of the first optical connector, the outer guide part retracts and the inner guide part is exposed toward the second optical connector, so that an outer peripheral portion of the inner guide part guides the head with respect to a ferrule endface of the second optical connector. With this cleaning tool, the ferrule endface inside optical connector receptacles having different shapes of housings can be easily cleaned.

Each of the first optical connector and the second optical connector may be an optical receptacle, and a shape of an inner surface of the housing of the first optical connector and a shape of an inner surface of the housing of the second optical connector are different from each other. With this configuration, the ferrule endface inside optical connector receptacles having different diameters of connector housing holes of the housings can be easily cleaned.

In the case of cleaning of the second optical connector, the outer guide part may be retracted by pressing an end surface of the outer guide part toward the second optical connector onto an end surface of the housing of the second optical connector. With this configuration, an inner guide outer peripheral portion of the inner guide part exposed toward the second optical connector can be guided to an inner wall surface of the housing of the second optical connector.

A flat surface may be formed to the outer peripheral portion of the inner guide part. With this configuration, the ferrule endface of various types of optical connectors can be easily cleaned.

The extension part may be movable in a predetermined direction with respect to the tool body, and the cleaning tool further comprises a feeding mechanism that utilizes relative movement between the tool body and the extension part to supply the cleaning element to the pressing surface and to collect the cleaning element on the pressing surface. With this configuration, the cleaning element can be supplied and collected with a simple operation.

In the case of cleaning of the first optical connector, the relative movement may be caused by pressing an end surface of the inner guide part toward the first optical connector onto the housing of the first optical connector. With this configuration, the cleaning element can be supplied and collected with a simple operation.

The extension part may include a plug-side guide part that allows the head to be inserted through an inside of the plug-side guide part, and in the case of cleaning of the second optical connector, the relative movement is caused by pressing an end surface of the plug-side guide part toward the second optical connector onto the housing of the second optical connector. With this configuration, the cleaning element can be supplied and collected with a simple operation.

(2) Incidentally, in the cleaning tool described in Patent Literature 1 and Patent Literature 2, both a ferrule endface inside an optical adapter and a ferrule endface of an optical plug can be cleaned by attaching an attachment to the insertion portion. However, such a configuration has hitherto been requiring the attachment to be attached or removed, depending on whether a cleaning target is the ferrule endface inside the optical adapter or the ferrule endface of the optical plug. Therefore, operation efficiency of the entire cleaning operation may be reduced, due to the time and effort for the operation of attaching or removing the attachment.

A cooling tool of one or more embodiments is discussed below. Specifically, the cleaning tool includes a tool body, and an extension part that extends from the tool body, the extension part including a head that presses a cleaning element onto a cleaning target on a pressing surface. The cleaning tool will become clear, wherein the extension part includes a plug-side guide part that allows the head to be inserted through an inside of the plug-side guide part, and in a case of cleaning of an optical plug, an end surface of the plug-side guide part projects further toward the optical plug than an end surface of the head, and in a case of cleaning of an optical adapter to which the optical plug is connected, the plug-side guide part retracts, and the end surface of the head is exposed toward the optical adapter. With the cleaning tool, both the ferrule endface inside the optical adapter and the ferrule endface of the optical plug can be easily cleaned.

An outer peripheral portion of the plug-side guide part may be provided to guide the head with respect to a ferrule endface of the optical plug. With this configuration, the cleaning element can be accurately placed to face the ferrule endface.

The inside of the plug-side guide part may be provided to allow a ferrule of the optical plug to be inserted into the plug-side guide part. With this configuration, the cleaning element can be accurately placed to face the ferrule endface.

In the case of cleaning of the optical plug, the plug-side guide part may be retracted by pressing the end surface of the plug-side guide part toward the optical plug onto an abutment surface inside the connector housing of the optical plug. With this configuration, an end surface of an adapter-side guide part toward the optical plug can be pressed onto the connector housing of the optical plug.

The extension part may be movable in a predetermined direction with respect to the tool body, and the cleaning tool further comprises a feeding mechanism that utilizes relative movement between the tool body and the extension part to supply the cleaning element to the pressing surface and to collect the cleaning element on the pressing surface. With this configuration, the cleaning element can be supplied and collected with a simple operation.

The extension part further may include an adapter-side guide part that allows the plug-side guide part to be inserted through the adapter-side guide part, and in the case of cleaning of the optical plug, the relative movement is caused by pressing an end surface of the adapter-side guide part toward the optical plug onto the connector housing of the optical plug. With this configuration, the cleaning element can be supplied and collected with a simple operation.

The extension part may further include an adapter-side guide part that allows the plug-side guide part to be inserted through the adapter-side guide part, and in the case of cleaning of the optical adapter, a flat surface of an outer peripheral portion of the adapter-side guide part is provided to guide the head with respect to the ferrule endface of the optical plug connected to the optical adapter. With this configuration, the cleaning element can be accurately placed to face the ferrule endface.

In the case of cleaning of the optical adapter, the relative movement may be caused by pressing an end surface of the adapter-side guide part toward the optical adapter onto a sleeve holder end portion of the optical adapter. With this configuration, the cleaning element can be supplied and collected with a simple operation.

The extension part may further include a plug-side spring that urges the plug-side guide part toward the optical plug. With this configuration, both the ferrule endface inside the optical adapter and the ferrule endface of the optical plug can be easily cleaned.

Figure 2:
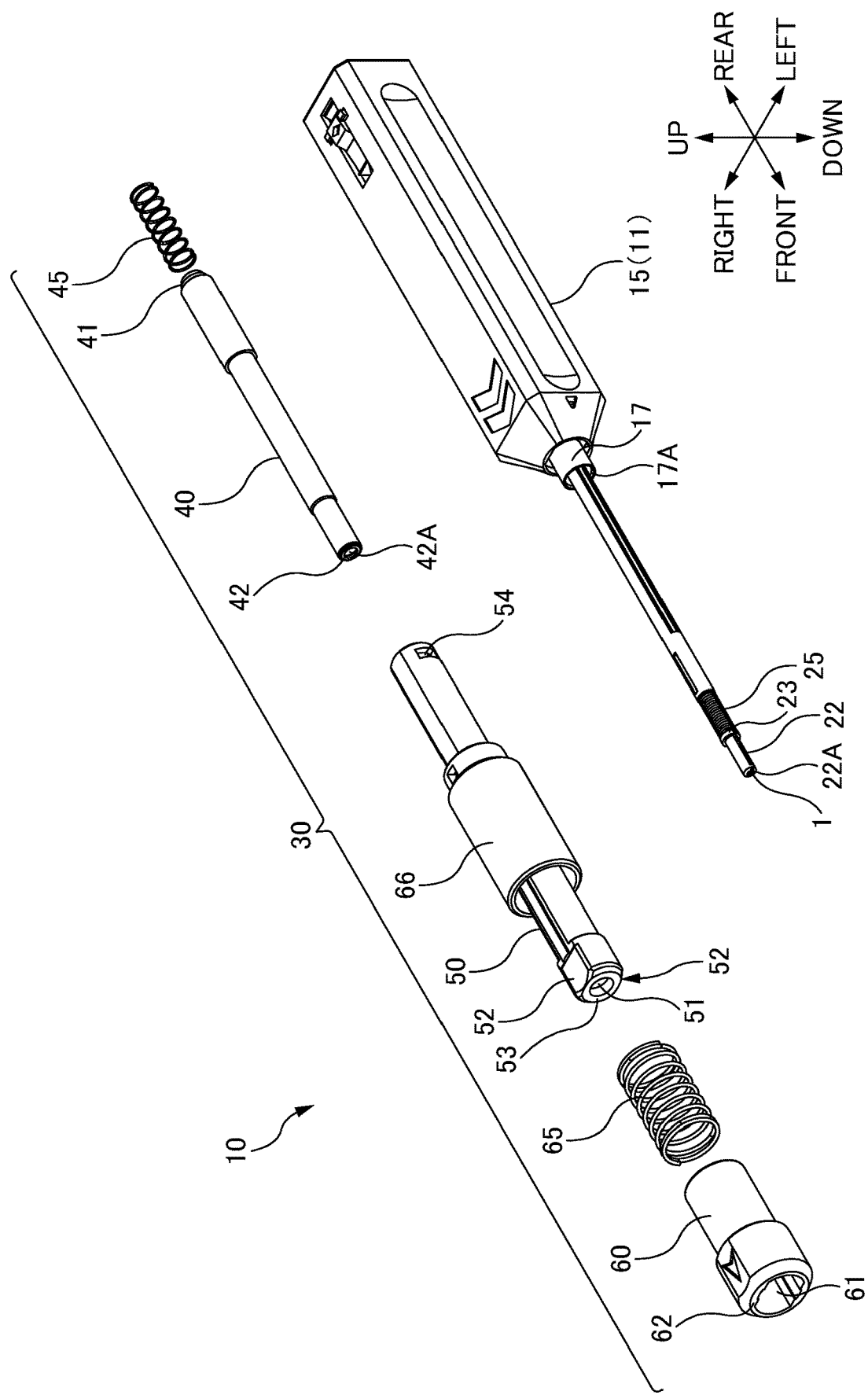
FIG. 2 is an exploded perspective view of the cleaning tool 10 according to one or more embodiments.
Figure 3:
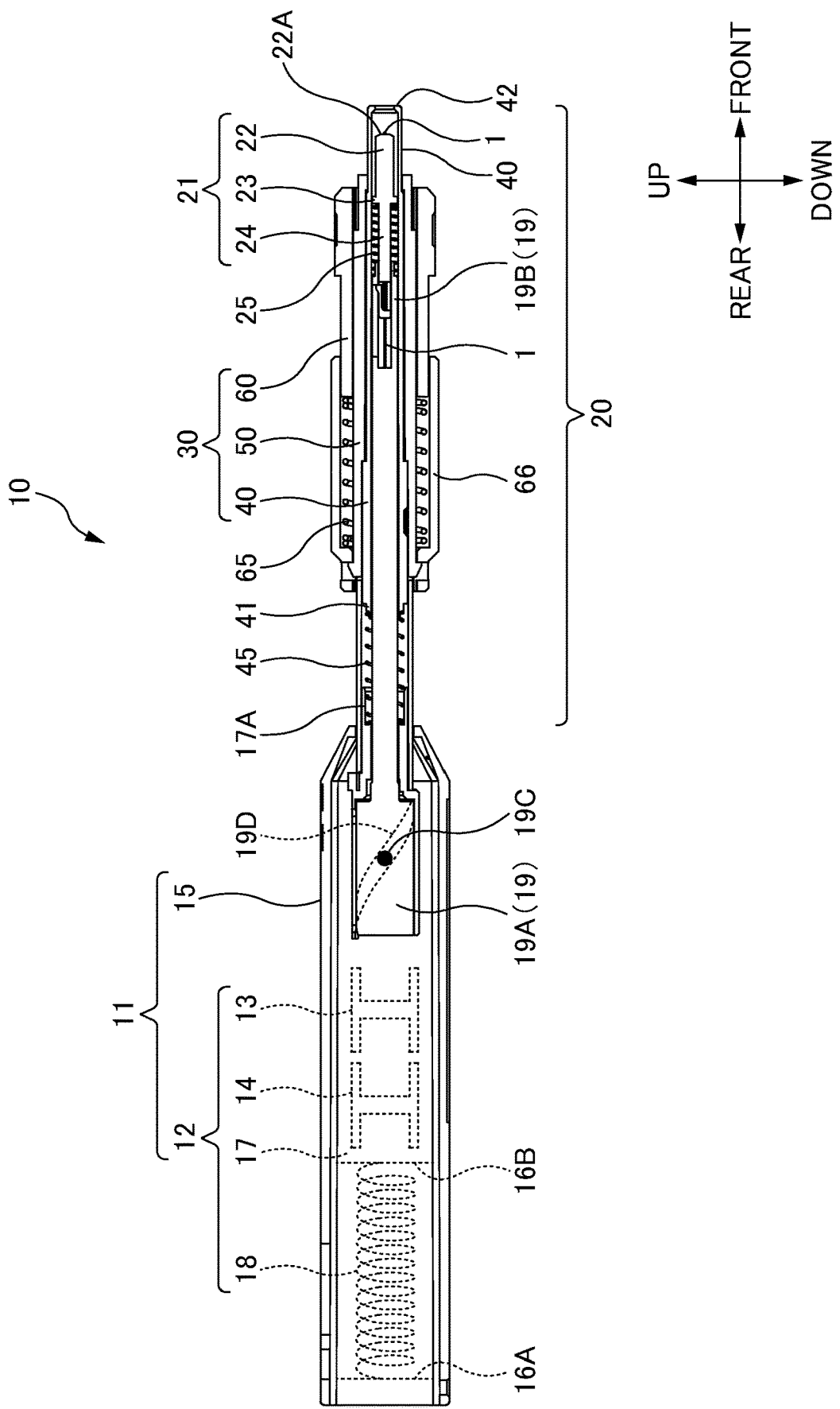
FIG. 3 is a cross-sectional view of the cleaning tool 10 according to one or more embodiments taken along the line A-A of FIG. 1.

Overall Configuration of Cleaning Tool 10:

FIG. 1 is an overall perspective view of a cleaning tool 10 according to one or more embodiments. FIG. 2 is an exploded perspective view of the cleaning tool 10 according to one or more embodiments. FIG. 3 is a cross-sectional view of the cleaning tool 10 according to one or more embodiments taken along the line A-A of FIG. 1.

In the following description, directions will be defined as illustrated in the drawings. Specifically, a direction in which an extension part 20 extends from a tool body 11 is defined as a "front-rear direction"; the extension part 20 side as seen from the tool body 11 is defined as a "front" side, and the opposite side thereof is defined as a "rear" side. Of directions perpendicular to the front-rear direction, a direction in which two flat surfaces 52 formed in an inner guide part 50 are arranged is defined as an "up-down direction" (see FIG. 2). Note that the up-down direction is also an axial direction of a rotation axis of a supply reel 13 or a rotation axis of a take-up reel 14 inside the tool body 11 (see FIG. 3). A direction perpendicular to the front-rear direction and the up-down direction is defined as a "left-right direction".

The cleaning tool 10 is a tool for cleaning a ferrule endface (optical fiber end-face) of an optical connector. In the following description, prior to giving description of a configuration of the cleaning tool 10 according to one or more embodiments, cleaning operation (push operation and pull operation) at the time of cleaning an optical connector by using the cleaning tool 10 will be described. As illustrated in FIG. 1, the cleaning tool 10 includes a tool body 11, and an extension part 20 relatively movable in the front-rear direction with respect to the tool body 11. As illustrated in FIG. 3, the cleaning tool 10 includes a head part 21, and a feeding mechanism 12 that supplies and collects a cleaning element 1. A pressing surface 22A (head surface) is provided on a front end portion of the head part 21, and the cleaning element 1 extends across the pressing surface 22A. The feeding mechanism 12 supplies an unused portion of the cleaning element 1 to the pressing surface 22A and collects a used portion of the cleaning element 1, by utilizing the relative movement between the tool body 11 and the extension part 20 at the time of cleaning (this will be described later).

When an optical connector is cleaned by using the cleaning tool 10, an operator holds the tool body 11 in a hand, inserts a tip end of the extension part 20 into an insertion opening of the optical connector, presses the cleaning element 1 provided on the pressing surface 22A onto the optical connector, and in this state, moves the tool body 11 toward the front side (push operation). After that, the operator pulls the extension part 20 out of the optical connector (pull operation). In this manner, the push operation and the pull operation are performed during the cleaning operation. In the push operation, the tool body 11 moves to the front side with respect to the extension part 20; in other words, when seen from the tool body 11, the extension part 20 moves to the rear side with respect to the tool body 11. In the pull operation, the tool body 11 moves to the rear side with respect to the extension part 20; in other words, when seen from the tool body 11, the extension part 20 moves to the front side with respect to the tool body 11.

As described above, the feeding mechanism 12 supplies and collects the cleaning element 1, by utilizing the relative movement between the tool body 11 and the extension part 20 in the front-rear direction at the time of cleaning. Note that the feeding mechanism 12 may supply and collect the cleaning element 1 with another method. For example, a disk-like dial may be provided, and the cleaning element 1 may be supplied and collected by an operator turning the dial. The cleaning tool 10 including such a feeding mechanism 12 need not cause relative movement between the tool body 11 and the extension part 20 in the front-rear direction.

In one or more embodiments, the cleaning element 1 has a thread-like shape. Note that the shape of the cleaning element 1 is not limited to the thread-like shape, and may be a wide strip-like shape (tape-like shape). When a strip-like cleaning element 1 is used, an end-face of an optical fiber at an end surface of an optical connector can be securely cleaned. As the cleaning element 1, non-woven fabric or woven fabric made of fibers of polyester, nylon, or the like may be used. Note that the material and the form of the cleaning element 1 are not limited to those described above.

Next, the configuration of the cleaning tool 10 according to one or more embodiments will be described. As described above, the cleaning tool 10 includes the tool body 11 and the extension part 20 (see FIG. 1).

The tool body 11 is a part held by an operator at the time of cleaning. The tool body 11 includes a body housing 15 and the feeding mechanism 12 (see FIG. 3).

The body housing 15 is a housing that houses, in its inside, the cleaning element 1 and the feeding mechanism 12 that supplies and collects the cleaning element 1, for example. A spring receiving part 16A is fixed to the body housing 15. The spring receiving part 16A is a part that retains one end of a coil spring 18 to be described later. The spring receiving part 16A is provided on a rear inner wall surface of the body housing 15, and comes in contact with one end (rear end portion) of the coil spring 18.

The feeding mechanism 12 is a mechanism for supplying and collecting the cleaning element 1. The feeding mechanism 12 includes the supply reel 13, the take-up reel 14, a moving member 17, and the coil spring 18 (see FIG. 3).

The supply reel 13 is a reel that supplies an unused portion of the cleaning element 1. The unused portion of the cleaning element 1 is wound around the supply reel 13. The take-up reel 14 is a reel that winds back and collects a used portion of the cleaning element 1. The moving member 17 is a member that relatively moves in the front-rear direction with respect to the body housing 15, together with the extension part 20. The moving member 17 rotatably supports each of the supply reel 13 and the take-up reel 14. The moving member 17 rotatably supports a rotary tubular part 19A of a rotating member 19 to be described later. A spring receiving part 16B is provided in the moving member 17. The spring receiving part 16B is a part that retains one end of the coil spring 18. The spring receiving part 16B is provided on a rear end surface of the moving member 17, and comes in contact with one end (front end portion) of the coil spring 18.

The coil spring 18 is an elastic member for restoring a positional relationship between the tool body 11 and the extension part 20. The coil spring 18 is arranged between the body housing 15 and the moving member 17. Specifically, the front end portion of the coil spring 18 is retained by the spring receiving part 16B of the moving member 17, and the rear end portion of the coil spring 18 is retained by the spring receiving part 16A of the body housing 15. When the extension part 20 moves to the rear side with respect to the tool body 11 at the time of cleaning of an optical connector, the moving member 17 moves to the rear side with respect to the body housing 15 inside the body housing 15. In this manner, the coil spring 18 is compressed and deformed. When the compressed and deformed coil spring 18 is restored, the moving member 17 moves to the front side with respect to the body housing 15 to return to the original position inside the body housing 15. In this manner, the extension part 20 moves to the front side with respect to the tool body 11, to return to the original position.

Note that, in the feeding mechanism 12 of the cleaning tool 10 according to one or more embodiments, a rack (not illustrated) fixed to the body housing 15 and a pinion (not illustrated) that transmits rotating motion to the take-up reel 14 constitute a rack-and-pinion mechanism. With this configuration, linear motion between the tool body 11 and the extension part 20 in the front-rear direction at the time of cleaning is converted into rotating motion. When the tool body 11 and the extension part 20 relatively move in the front-rear direction at the time of cleaning, the moving member 17 relatively moves, inside the body housing 15, in the front-rear direction with respect to the body housing 15, and this relative movement rotates the pinion. In this manner, the take-up reel 14 rotates in a take-up direction to collect the cleaning element 1, and an unused portion of the cleaning element 1 corresponding to an amount collected by the take-up reel 14 is supplied from the supply reel 13.

The cleaning tool 10 according to one or more embodiments further includes a rotating member 19 for rotating the head part 21. Further, a pin-like insertion protrusion 19C provided on an inner wall surface of the body housing 15 is fitted into a cam groove 19D of the rotary tubular part 19A of the rotating member 19, and the insertion protrusion 19C and the cam groove constitute a rotating mechanism (mechanism for rotating the rotating member 19). With this configuration, the head part 21 that presses the cleaning element 1 onto an optical connector is rotated in a rotating direction about an axis along the front-rear direction, by utilizing the relative movement between the tool body 11 and the extension part 20 in the front-rear direction at the time of cleaning. Note that the head part 21 need not be rotated.

The rotating member 19 is a member that rotates in an oscillating manner (rotates in a reciprocating manner) about an axis along the front-rear direction, and is a member that rotates the head part 21. The rotating member 19 includes a rotary tubular part 19A and a head support part 19B (see FIG. 3).

The rotary tubular part 19A is a cylindrical part that rotates in an oscillating manner (rotates in a reciprocating manner) about an axis along the front-rear direction. A helical cam groove 19D is formed on an outer surface of the rotary tubular part 19A, and the insertion protrusion 19C provided on an inner wall surface of the body housing 15 is fitted in to the cam groove 19D. The rotary tubular part 19A is rotatably supported by the moving member 17 of the tool body 11, and relatively moves in the front-rear direction with respect to the body housing 15, together with the moving member 17 (and the extension part 20). The rotary tubular part 19A is formed into a hollow shape. Through the rotary tubular part 19A, an unused portion of the cleaning element 1 to be supplied from the supply reel 13 to the pressing surface 22A is inserted in the front-rear direction, and a used portion of the cleaning element 1 to be collected from the pressing surface 22A by the take-up reel 14 is inserted in the front-rear direction.

The head support part 19B is a part that supports the head part 21. The head support part 19B is provided at a front end portion of the rotating member 19, and is connected to the rotary tubular part 19A. The head support part 19B supports the head part 21, such that the head part 21 can retract when the cleaning element 1 is pressed onto an optical connector on the pressing surface 22A. The head support part 19B supports the head part 21 while restricting (limiting) relative movement in the rotating direction between the head support part 19B and the head part 21 such that the relative movement in the rotating direction is prevented. With this configuration, when the rotating member 19 rotates about an axis along the front-rear direction, the head part 21 also rotates together with the rotating member 19. The head support part 19B is also a part that retains one end of a head spring 25 to be described later. A front end of the head support part 19B comes in contact with a rear end of the head spring 25.

The extension part 20 is a member to be inserted into an insertion opening of an optical connector as a cleaning target. The extension part 20 is provided to extend toward the front side from the tool body 11. The extension part 20 is relatively movable in the front-rear direction with respect to the tool body 11. The extension part 20 includes the head part 21, the head spring 25, and a guide unit 30 (see FIG. 3).

The head part 21 is a member that presses the cleaning element 1 onto an optical connector as a cleaning target. The head part 21 is housed inside a plug-side guide part 40 to be described later. Note that, when the plug-side guide part 40 retracts with respect to the head part 21, a part (head 22) located on a front side of the head part 21 can pass through an insertion hole 42A formed on a plug-side guide end surface 42 of the plug-side guide part 40 to be exposed to the outside of the plug-side guide part 40 (this will be described later). The head part 21 includes the head 22, a flange section 23, and a proximal end portion 24 (see FIG. 3).

The head 22 is a part that presses the cleaning element 1 onto a cleaning target. The head 22 is a part located on a front side of the head part 21. The pressing surface 22A (head surface) for pressing the cleaning element 1 onto a cleaning target is provided on a front end portion of the head 22. The cleaning element 1 extends across the pressing surface 22A. The cleaning element 1 extending across the pressing surface 22A is exposed to the outside of the head 22, such that the cleaning element 1 can be pressed onto an optical connector. Note that the head part 21 is housed inside the plug-side guide part 40, and the pressing surface 22A is located on the rear side than the plug-side guide end surface 42 of the plug-side guide part 40, and thus the cleaning element 1 is also located inside the plug-side guide part 40 (this will be described later). Note that, when the plug-side guide part 40 retracts with respect to the head part 21, the head 22 can pass through the insertion hole 42A formed on the plug-side guide end surface 42 to be exposed to the outside of the plug-side guide part 40, and at this time, the cleaning element 1 is also exposed to the outside of the plug-side guide part 40 (this will be described later).

The flange section 23 is a part that retains one end of the head spring 25 to be described later. The flange section 23 is such a part that its outer circumference projects further than the head 22, at a position on a rear side of the head 22. The flange section 23 comes in contact with a front end portion of the head spring 25, and the head 22 (head part 21) is pressed toward the front side by the head spring 25, with the flange section 23 being interposed between the head 22 (head part 21) and the head spring 25.

The proximal end portion 24 is a part located on the rear side of the flange section 23. The proximal end portion 24 is retractably supported by the head support part 19B, with its relative rotation movement with respect to the head support part 19B being restricted. The proximal end portion 24 is inserted through the head spring 25.

The head spring 25 is an elastic member for pressing the head part 21 toward the front side. The head spring 25 is arranged between the flange section 23 of the head part 21 and the head support part 19B of the rotating member 19. Specifically, a front end portion of the head spring 25 is retained by the flange section 23 of the head part 21, and a rear end portion of the head spring 25 is retained by the head support part 19B of the rotating member 19. When the head part 21 moves to the rear side with respect to the plug-side guide part 40 at the time of cleaning, the head spring 25 is compressed and deformed. In this manner, the cleaning element 1 can be pressed onto an optical connector on the pressing surface 22A of the head part 21 with predetermined pressure.

The guide unit 30 is a member to serve as a guide when the tip end of the extension part 20 is inserted into an insertion opening of an optical connector as a cleaning target. The guide unit 30 is also a member (cover) for covering the head part 21 and the rotating member 19 in the extension part 20. The guide unit 30 includes a plurality of members. A detailed configuration of the guide unit 30 will be described below.

Guide Unit 30:

Next, with reference to FIG. 2 and FIG. 3, a detailed configuration of the guide unit 30 will be described. In the following description, an optical connector as a cleaning target of the cleaning tool 10 will be first described, and then a detailed configuration of the guide unit 30 will be described.

As described above, the cleaning tool 10 is a tool for cleaning a ferrule endface (optical fiber end-face) of an optical connector. In one or more embodiments, an optical connector plug (hereinafter simply referred to as an "optical plug"), which has a configuration in which a ferrule is housed in a tip end portion of a connector housing, can be a cleaning target of the cleaning tool 10. An optical connector receptacle (hereinafter simply referred to as an "optical receptacle"), into which an optical plug is inserted from one side so that the optical plug is optically connected with an inside optical connector (ferrule), can also be a cleaning target of the cleaning tool 10. Note that, in the following description, the optical receptacle includes an optical connector adapter (hereinafter simply referred to as "optical adapter"), which has a configuration in which an optical plug is inserted into a connector housing hole of a housing (adapter housing). Note that optical connectors other than those described above can also be a cleaning target of the cleaning tool 10.

As described above, a ferrule endface of various types of optical connectors, such as an optical plug and an optical receptacle, can be a cleaning target of the cleaning tool 10. Here, when types of optical connectors are different, there are different shapes of insertion openings into which the tip end of the extension part 20 of the cleaning tool 10 is to be inserted. In one or more embodiments, owing to the configuration that the extension part 20 includes the guide unit 30, the cleaning element 1 can be accurately placed to face a ferrule endface of various types of optical connectors, simply by inserting the tip end of the extension part 20 into insertion openings having different shapes. In this case, an operator of a cleaning operation only needs to insert the tip end of the extension part 20 into an insertion opening, with the guide unit 30 being attached to the cleaning tool 10. In this manner, the operator of the cleaning operation need not attach or remove an attachment depending on a cleaning target, irrespective of whether the cleaning target is a ferrule endface of an optical plug or a ferrule endface inside an optical receptacle, for example. In this manner, a ferrule endface of various types of optical connectors can be easily cleaned, and reduction in operation efficiency of the entire cleaning operation can be prevented.

The guide unit 30 includes the plug-side guide part 40, a plug-side spring 45, the inner guide part 50, an outer guide part 60, an outer spring 65, and an outer spring receiving part 66 (see FIG. 2 and FIG. 3).

The plug-side guide part 40 is a member that guides the tip end of the extension part 20 of the cleaning tool 10 by being fitted into an inner side (inner wall surface 72B) of a connector housing 72 of an optical plug 70 to be described later (see FIG. 4C). The plug-side guide part 40 is a cylindrical member that covers the rotating member 19 and the head part 21. The plug-side guide part 40 is formed into a hollow shape. Through the plug-side guide part 40, the rotating member 19 and the head part 21 are inserted in the front-rear direction.

A spring receiving part 41 is provided in the plug-side guide part 40. The spring receiving part 41 is a part that retains one end of the plug-side spring 45 to be described later. The spring receiving part 41 is provided at a rear end portion of the plug-side guide part 40, and comes in contact with one end (front end portion) of the plug-side spring 45.

The plug-side guide end surface 42 is provided on the plug-side guide part 40. The plug-side guide end surface 42 is a part to come into abutment with a part of an optical connector as a cleaning target (for example, an abutment surface 72C of the connector housing 72 of the optical plug 70 to be described later, see FIG. 5B). The plug-side guide end surface 42 is provided at a front end portion of the plug-side guide part 40. When the plug-side guide end surface 42 is pressed toward the rear side by a part of an optical connector as a cleaning target (for example, the abutment surface 72C of the connector housing 72 of the optical plug 70 to be described later, see FIG. 5B), the plug-side guide part 40 can retract with respect to the inner guide part 50. The plug-side guide part 40 can also retract with respect to the head part 21. Note that, in the cleaning tool 10 according to one or more embodiments, the plug-side guide end surface 42 is located on the front side than the pressing surface 22A of the head 22 of the head part 21 that is inserted through the inside of the plug-side guide part 40.

The insertion hole 42A is provided in the plug-side guide end surface 42. The insertion hole 42A is an opening having such a size as to allow the head 22 of the head part 21 to be inserted therethrough. Therefore, when the plug-side guide part 40 retracts with respect to the head part 21, the pressing surface 22A of the head 22 of the head part 21 is located on the front side than the plug-side guide end surface 42. In the following description, such a state in which the pressing surface 22A of the head 22 is located on the front side than the plug-side guide end surface 42 as described above may be referred to as a state in which the head 22 (head part 21) is "exposed to the front side".

In the cleaning tool 10 according to one or more embodiments, the insertion hole 42A is also an opening having such a size as to allow a ferrule of an optical connector as a cleaning target to be inserted therethrough. The insertion hole 42A may be an opening having substantially the same size as that of an outer peripheral portion of a ferrule. With this configuration, when a ferrule is inserted into the inside of the plug-side guide part 40 through the insertion hole 42A at the time of cleaning of an optical connector, the ferrule can be guided. Therefore, the cleaning element 1 can be accurately placed to face a ferrule endface. Note that the insertion hole 42A may have any shape, on the condition that the head 22 and a ferrule of an optical connector as a cleaning target can be inserted through the insertion hole 42A.

The plug-side spring 45 is an elastic member that presses the plug-side guide part 40 toward the front side so as to be retractable with respect to the inner guide part 50 and the head part 21. The plug-side spring 45 is also an elastic member for restoring a positional relationship between the plug-side guide part 40 and the inner guide part 50 and between the plug-side guide part 40 and the head part 21. The plug-side spring 45 is arranged between the plug-side guide part 40 and the moving member 17. Specifically, a front end portion of the plug-side spring 45 is retained by the spring receiving part 41 of the plug-side guide part 40, and a rear end portion of the plug-side spring 45 is retained by a spring receiving part 17A of the moving member 17 (see FIG. 3). When the plug-side guide part 40 is pressed toward the rear side at the time of cleaning of an optical connector, the plug-side guide part 40 moves to the rear side with respect to the inner guide part 50 and the head part 21. In this manner, the plug-side spring 45 is compressed and deformed. When the compressed and deformed plug-side spring 45 is restored, the plug-side guide part 40 moves to the front side with respect to the inner guide part 50 and the head part 21, to return to the original position.

The inner guide part 50 is a member that guides the tip end of the extension part 20 of the cleaning tool 10 by being fitted into an inner side (inner wall surface 97A) of a receptacle housing 97 of a second optical receptacle 96 to be described later (see FIG. 9A). The inner guide part 50 is a member that guides the tip end of the extension part 20 of the cleaning tool 10 by being fitted into an inner side (inner wall surface 81B) of an adapter housing 81 of an optical adapter 80 to be described later (see FIG. 10C). The inner guide part 50 is a cylindrical member that covers the plug-side guide part 40. The inner guide part 50 is formed into a hollow shape. Through the inner guide part 50, the plug-side guide part 40 is inserted in the front-rear direction.

An engagement recess 54 is provided in the inner guide part 50 (see FIG. 2). The engagement recess 54 is a part that fixes the inner guide part 50 to the moving member 17. The engagement recess 54 is a recess provided in a rear end portion of the inner guide part 50. When an engagement protrusion (not illustrated) of the moving member 17 of the tool body 11 is engaged with the engagement recess 54, the engagement recess 54 fixes the inner guide part 50 to the moving member 17. Therefore, when the moving member 17 relatively moves in the front-rear direction with respect to the body housing 15, the inner guide part 50 also relatively moves in the front-rear direction with respect to the body housing 15 in a similar manner. As seen from the inner guide part 50, when the inner guide part 50 relatively moves in the front-rear direction, the moving member 17 relatively moves in the front-rear direction with respect to the body housing 15 in a similar manner. In other words, the inner guide part 50 and the moving member 17 integrally relatively move in the front-rear direction with respect to the body housing 15.

An inner guide end surface 53 is provided on the inner guide part 50. The inner guide end surface 53 is a part to come into abutment with a part of an optical connector as a cleaning target (for example, an abutment portion 92C of a receptacle housing 92 of the first optical receptacle 91 to be described later, see FIG. 7B). The inner guide end surface 53 is provided at a front end portion of the inner guide part 50. When the inner guide end surface 53 is pressed toward the rear side by a part of an optical connector as a cleaning target (for example, the abutment portion 92C of the receptacle housing 92 of the first optical receptacle 91 to be described later, see FIG. 7B), the inner guide part 50 can retract with respect to the body housing 15, together with the moving member 17. An insertion hole 51 is provided in the inner guide end surface 53. The insertion hole 51 is an opening having such a size as to allow the plug-side guide part 40 to be inserted therethrough.

The outer guide part 60 is a member that guides the tip end of the extension part 20 of the cleaning tool 10 by being fitted into an inner side (inner wall surface 92A) of the receptacle housing 92 of the first optical receptacle 91 to be described later (see FIG. 6B). The outer guide part 60 is a cylindrical member that covers the inner guide part 50. The outer guide part 60 is formed into a hollow shape. Through the outer guide part 60, the inner guide part 50 is inserted in the front-rear direction.

An outer guide end surface 62 is provided on the outer guide part 60. The outer guide end surface 62 is a part to come into abutment with a part of an optical connector as a cleaning target (for example, a housing end surface 97C of the receptacle housing 97 of the second optical receptacle 96 to be described later, see FIG. 8C). The outer guide end surface 62 is provided at a front end portion of the outer guide part 60. When the outer guide end surface 62 is pressed toward the rear side by a part of an optical connector as a cleaning target (for example, the housing end surface 97C of the receptacle housing 97 of the second optical receptacle 96 to be described later, see FIG. 8C), the outer guide part 60 can retract with respect to the inner guide part 50. An insertion hole 61 is provided in the outer guide end surface 62. The insertion hole 61 is an opening having such a size as to allow the inner guide part 50 to be inserted therethrough.

The outer spring 65 is an elastic member that presses the outer guide part 60 toward the front side so as to be retractable with respect to the inner guide part 50. The outer spring 65 is also an elastic member for restoring a positional relationship between the outer guide part 60 and the inner guide part 50. The outer spring 65 is arranged between the outer guide part 60 and the outer spring receiving part 66 to be described later. Specifically, a front end portion of the outer spring 65 comes in contact with a rear end of the outer guide part 60, and a rear end portion of the outer spring 65 is retained by the outer spring receiving part 66. When the outer guide part 60 is pressed toward the rear side at the time of cleaning of an optical connector, the outer guide part 60 moves to the rear side with respect to the inner guide part 50. In this manner, the outer spring 65 is compressed and deformed. When the compressed and deformed outer spring 65 is restored, the outer guide part 60 moves to the front side with respect to the inner guide part 50, to return to the original position.

The outer spring receiving part 66 is a part that retains one end of the outer spring 65. The outer spring receiving part 66 is fixed to the inner guide part 50, and comes in contact with one end (front end portion) of the outer spring 65. Since the outer spring receiving part 66 is fixed to the inner guide part 50, the outer spring receiving part 66 and the inner guide part 50 integrally relatively move in the front-rear direction with respect to the body housing 15, together with the moving member 17.

Figure 4A:
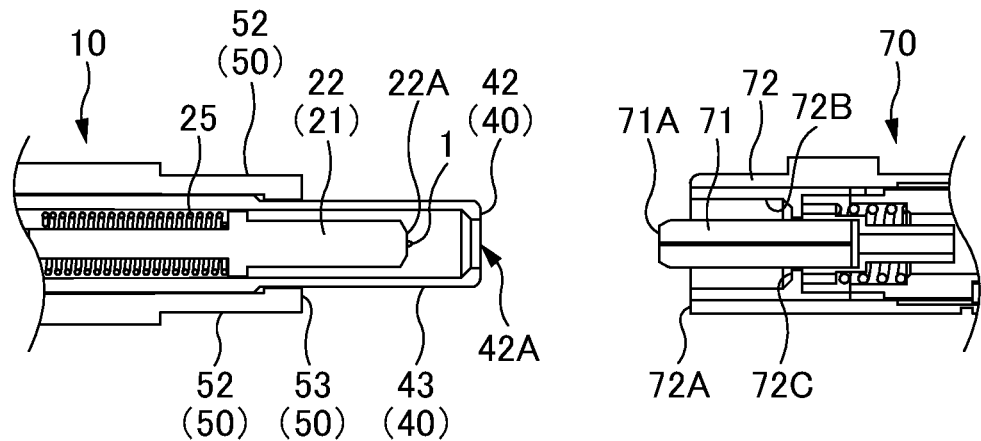
FIG. 4A to FIG. 4C are each a cross-sectional view illustrating a state of the cleaning tool 10 according to one or more embodiments at the time of cleaning an optical plug 70 (state before a cleaning element 1 is pressed onto a ferrule endface 71A).
Figure 4B:
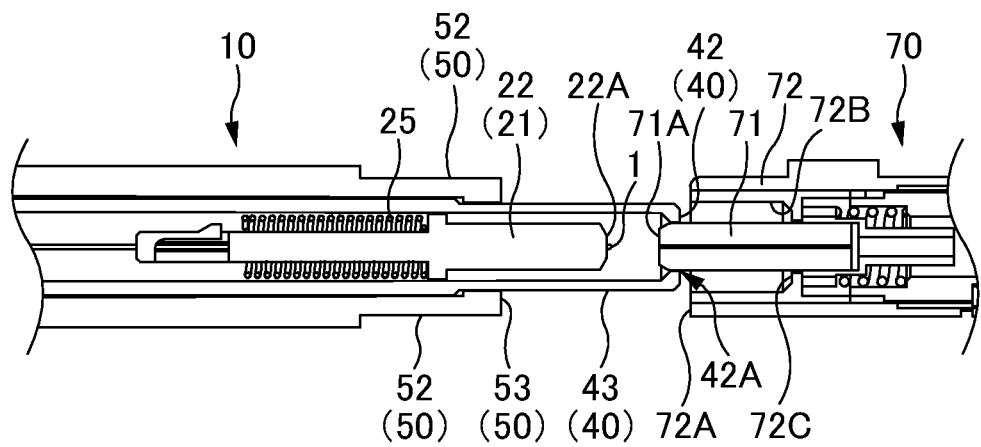
Figure 4C:
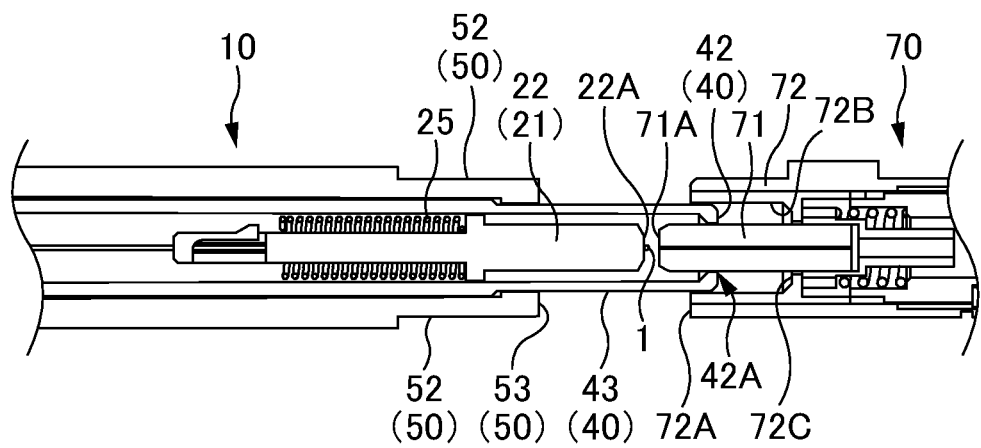
Figure 5A:
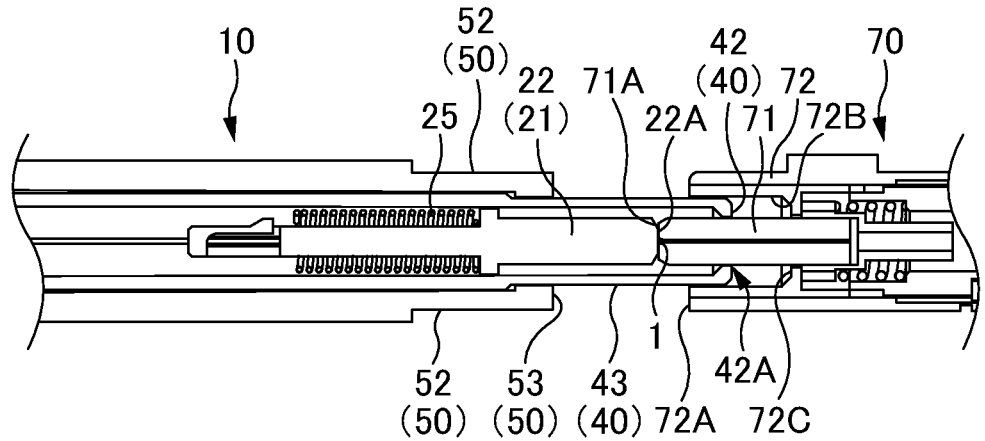
FIG. 5A to FIG. 5C are each a cross-sectional view illustrating a state of the cleaning tool 10 according to one or more embodiments at the time of cleaning the optical plug 70 (state after the cleaning element 1 is pressed onto the ferrule endface 71A).
Figure 5B:
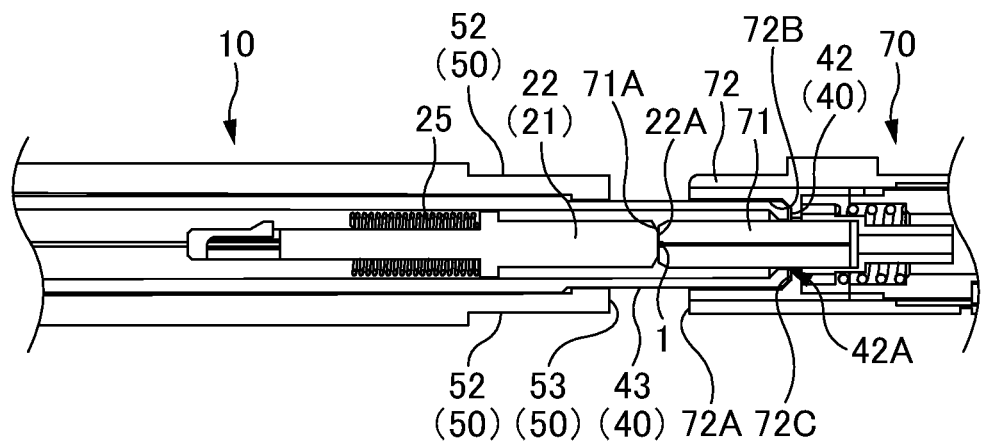
Figure 5C:
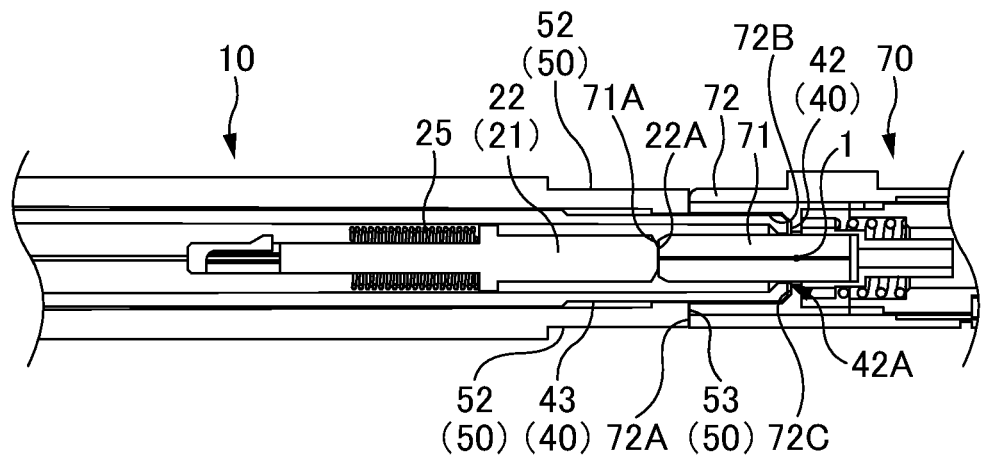

Procedure for Cleaning Optical Plug:

FIG. 4A to FIG. 4C are each a cross-sectional view illustrating a state of the cleaning tool 10 according to one or more embodiments at the time of cleaning the optical plug 70 (state before the cleaning element 1 is pressed onto a ferrule endface 71A). FIG. 5A to FIG. 5C are each a cross-sectional view illustrating a state of the cleaning tool 10 according to one or more embodiments at the time of cleaning the optical plug 70 (state after the cleaning element 1 is pressed onto the ferrule endface 71A). Note that, in FIG. 4A to FIG. 4C and FIG. 5A to FIG. 5C, illustration of the outer guide part 60, the outer spring 65, and the outer spring receiving part 66 is omitted.

FIG. 4A is a diagram illustrating a state of the cleaning tool 10 and the optical plug 70 before cleaning of the optical plug 70 in one or more embodiments. An operator of the cleaning operation moves the cleaning tool 10 to the optical plug 70 side so that the pressing surface 22A of the head 22 (the plug-side guide end surface 42 of the plug-side guide part 40) of the cleaning tool 10 faces the ferrule endface 71A of a ferrule 71 of the optical plug 70. At this time, as illustrated in FIG. 4B, the operator moves the cleaning tool 10 to the optical plug 70 side so that an end portion of the ferrule 71 is inserted into the insertion hole 42A of the plug-side guide end surface 42. As described above, the insertion hole 42A through which the head 22 can be inserted is also an opening having such a size as to allow the ferrule 71 to be inserted therethrough. The insertion hole 42A is also an opening having substantially the same size as that of an outer peripheral portion of the ferrule 71. In one or more embodiments, the ferrule 71 may be guided into the insertion hole 42A by the operator inserting the ferrule 71 into the insertion hole 42A. In this manner, a front end portion of the extension part 20 of the cleaning tool 10 is aligned to the optical plug 70 in the up-down direction and the left-right direction (directions perpendicular to the front-rear direction). Therefore, the operator can accurately place the cleaning element 1 to face the ferrule endface 71A.

When the operator further moves the cleaning tool 10 toward the optical plug 70, as illustrated in FIG. 4C, a plug-side guide outer peripheral portion 43 of the plug-side guide part 40 is fitted into the inner wall surface 72B of the connector housing 72 of the optical plug 70. At this time, the plug-side guide outer peripheral portion 43 serves as a guide surface when the cleaning element 1 is placed to face the ferrule endface 71A. In this manner, the front end portion of the extension part 20 of the cleaning tool 10 is aligned to the optical plug 70 in the up-down direction and the left-right direction (directions perpendicular to the front-rear direction). Therefore, the operator can accurately place the cleaning element 1 to face the ferrule endface 71A. Note that the plug-side guide outer peripheral portion 43 of the plug-side guide part 40 need not be fitted into the inner wall surface 72B of the connector housing 72 of the optical plug 70, on the condition that the plug-side guide outer peripheral portion 43 serves as a guide when the cleaning element 1 is placed to face the ferrule endface 71A.

When the operator further moves the cleaning tool 10 toward the optical plug 70, as illustrated in FIG. 5A, the head 22 inserted into the inside of the plug-side guide part 40 through the insertion hole 42A comes into abutment with the ferrule endface 71A. As described above, the cleaning element 1 extends across the pressing surface 22A of the head 22. Therefore, through the above operation, the cleaning element 1 is pressed onto the ferrule endface 71A. In one or more embodiments, the plug-side guide outer peripheral portion 43 of the plug-side guide part 40 is guided by the inner wall surface 72B of the connector housing 72 of the optical plug 70, and thus the cleaning element 1 can be accurately pressed onto the ferrule endface 71A. Note that, as described above, owing to the configuration that the cleaning tool 10 according to one or more embodiments includes the head spring 25, the cleaning tool 10 can press the cleaning element 1 onto the ferrule endface 71A on the pressing surface 22A of the head 22 with predetermined pressure.

When the operator further moves the cleaning tool 10 toward the optical plug 70, as illustrated in FIG. 5B, the plug-side guide end surface 42 of the plug-side guide part 40 comes into abutment with the abutment surface 72C of the optical plug 70. When the operator further moves the cleaning tool 10 toward the optical plug 70, the plug-side guide part 40 (plug-side guide end surface 42) receives a force backward from the connector housing 72 (abutment surface 72C), and the plug-side spring 45 located behind the plug-side guide part 40 is thereby compressed and deformed. In this manner, the plug-side guide part 40 can further move to the rear side with respect to the inner guide part 50. Then, as illustrated in FIG. 5C, the inner guide end surface 53 of the inner guide part 50 comes into abutment with an end surface 72A of the connector housing 72 of the optical plug 70.

In this state, when the cleaning tool 10 is further moved toward the optical plug 70, the inner guide end surface 53 of the inner guide part 50 is pressed toward the rear side from the end surface 72A of the connector housing 72, and the inner guide part 50 thereby retracts with respect to the body housing 15, together with the moving member 17. In this manner, the moving member 17 relatively moves in the front-rear direction with respect to the body housing 15 inside the body housing 15. This relative movement allows collection of the cleaning element 1 and supply of an unused portion of the cleaning element 1 corresponding to the collected amount. In other words, the cleaning element 1 can be supplied and collected with a simple operation of pressing the extension part 20 of the cleaning tool 10 into a cleaning target (here, the ferrule endface 71A of the optical plug 70). In other words, the cleaning element 1 can be supplied and collected with a simple operation of pressing the extension part 20 of the cleaning tool 10 into a cleaning target (here, the end surface 72A of the connector housing 72 of the optical plug 70).

Figure 6A:
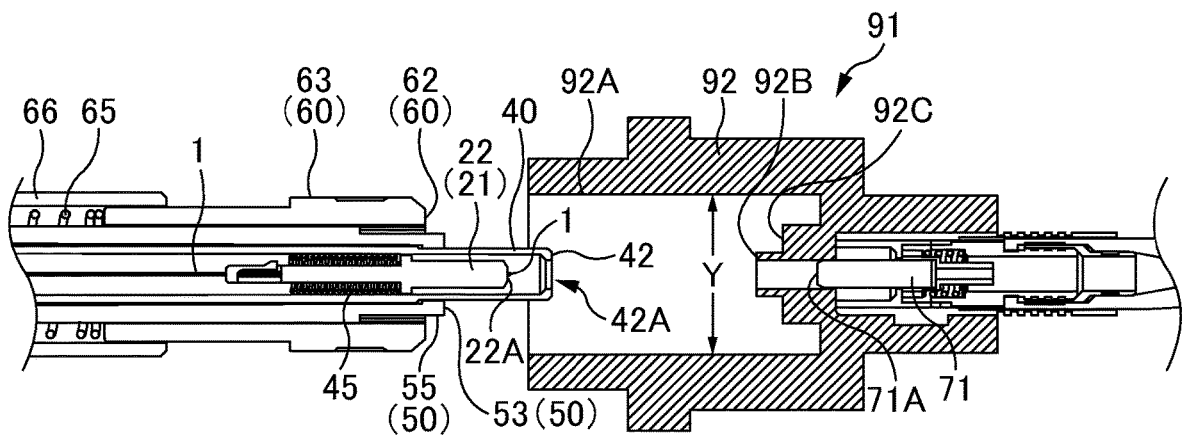
FIG. 6A to FIG. 6C are each a cross-sectional view illustrating a state of the cleaning tool 10 according to one or more embodiments at the time of cleaning a first optical receptacle 91 (state before the cleaning element 1 is pressed onto the ferrule endface 71A).
Figure 6B:
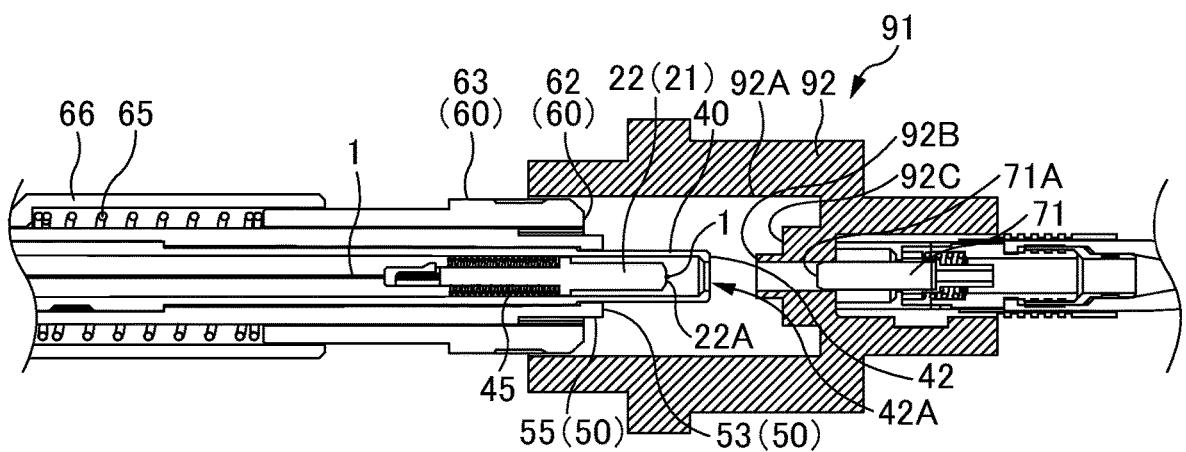
Figure 6C:
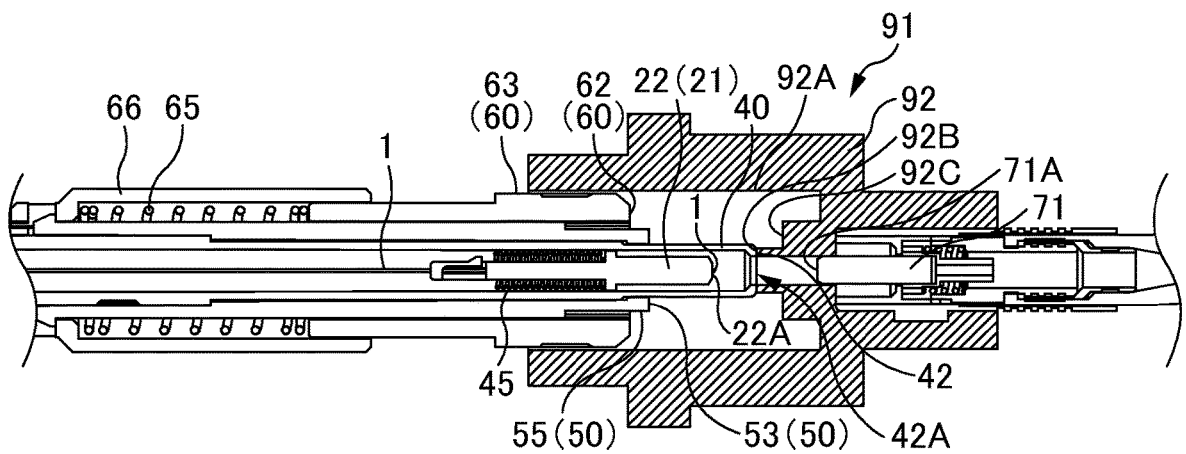
Figure 7A:
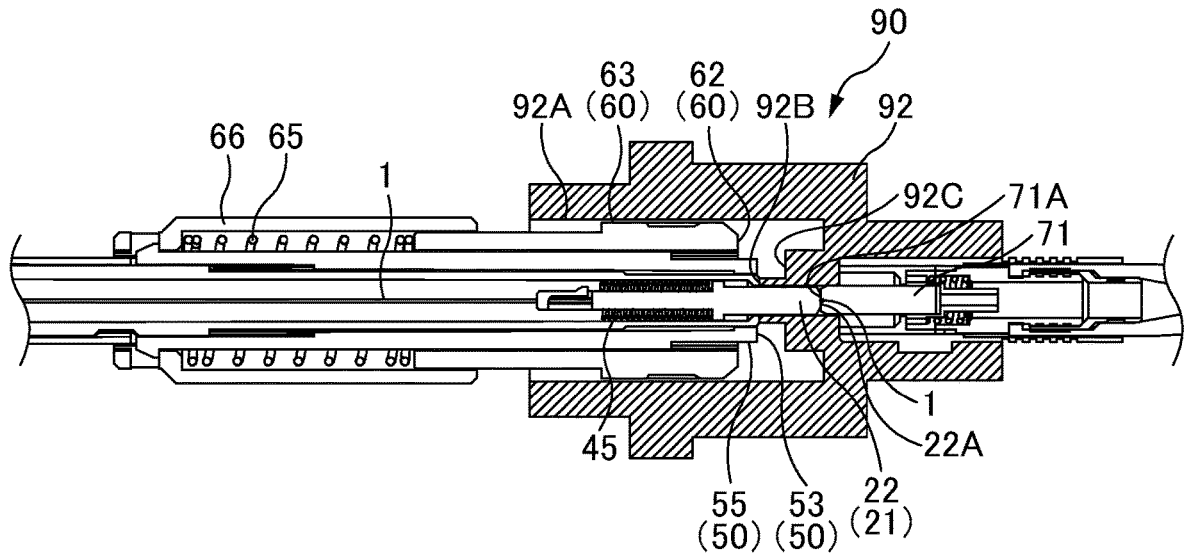
FIG. 7A and FIG. 7B are each a cross-sectional view illustrating a state of the cleaning tool 10 according to one or more embodiments at the time of cleaning the first optical receptacle 91 (state after the cleaning element 1 is pressed onto the ferrule endface 71A).
Figure 7B:
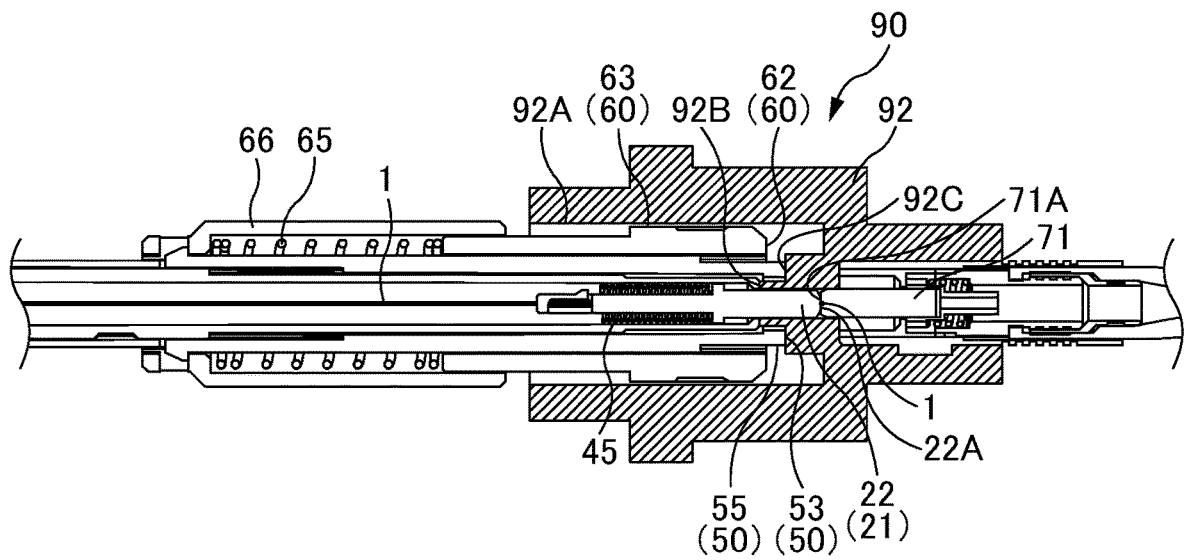

Procedure for Cleaning First Optical Receptacle:

FIG. 6A to FIG. 6C are each a cross-sectional view illustrating a state of the cleaning tool 10 according to one or more embodiments at the time of cleaning the first optical receptacle 91 (state before the cleaning element 1 is pressed onto the ferrule endface 71A). FIG. 7A and FIG. 7B are each a cross-sectional view illustrating a state of the cleaning tool 10 according to one or more embodiments at the time of cleaning the first optical receptacle 91 (state after the cleaning element 1 is pressed onto the ferrule endface 71A).

FIG. 6A is a diagram illustrating a state of the cleaning tool 10 and the first optical receptacle 91 before cleaning of the first optical receptacle 91 in one or more embodiments. An operator of the cleaning operation moves the cleaning tool 10 toward the first optical receptacle 91 so that the pressing surface 22A of the head 22 (the plug-side guide end surface 42 of the plug-side guide part 40) of the cleaning tool 10 faces the ferrule endface 71A of the ferrule 71 of the first optical receptacle 91.

When the operator moves the cleaning tool 10 toward the first optical receptacle 91, as illustrated in FIG. 6B, an outer guide outer peripheral portion 63 of the outer guide part 60 is fitted into the inner wall surface 92A of the receptacle housing 92 of the first optical receptacle 91. At this time, the outer guide outer peripheral portion 63 serves as a guide surface for placing the cleaning element 1 to face the ferrule endface 71A. In this manner, the front end portion of the extension part 20 of the cleaning tool 10 is aligned to the first optical receptacle 91 in the up-down direction and the left-right direction (directions perpendicular to the front-rear direction). Therefore, the operator can accurately place the cleaning element 1 to face the ferrule endface 71A. Note that the outer guide outer peripheral portion 63 of the outer guide part 60 need not be fitted into the inner wall surface 92A of the receptacle housing 92 of the first optical receptacle 91, on the condition that the outer guide outer peripheral portion 63 serves as a guide for placing the cleaning element 1 to face the ferrule endface 71A.

As illustrated in FIG. 6C, the operator moves the cleaning tool 10 toward the first optical receptacle 91 so that the plug-side guide end surface 42 comes into abutment with a rear end surface of a ferrule housing part 92B. In one or more embodiments, the outer guide outer peripheral portion 63 of the outer guide part 60 is guided by the inner wall surface 92A of the receptacle housing 92 of the first optical receptacle 91, and thus the plug-side guide end surface 42 of the plug-side guide part 40 can be caused to accurately come into abutment with the ferrule housing part 92B.

When the operator further moves the cleaning tool 10 toward the optical adapter 80 in the state in which the plug-side guide end surface 42 comes into abutment with the rear end surface of the ferrule housing part 92B (see FIG. 6C), the plug-side guide end surface 42 of the plug-side guide part 40 is pressed toward the rear side from the rear end surface of the ferrule housing part 92B, and the plug-side guide part 40 thereby retracts with respect to the head 22 and the inner guide part 50. When the plug-side guide part 40 retracts with respect to the head 22, the pressing surface 22A being an end surface of the head 22 is exposed to the front side further than the plug-side guide end surface 42 (see FIG. 7A). In this manner, in the state in which the plug-side guide end surface 42 comes into abutment with the rear end surface of the ferrule housing part 92B, the head 22 can be inserted into a ferrule insertion hole inside the ferrule housing part 92B. In one or more embodiments, the outer guide outer peripheral portion 63 of the outer guide part 60 is guided by the inner wall surface 92A of the receptacle housing 92 of the first optical receptacle 91, and thus the head 22 can be accurately inserted into the ferrule insertion hole inside the ferrule housing part 92B.

When the operator further moves the cleaning tool 10 toward the first optical receptacle 91, as illustrated in FIG. 7A, the head 22 is inserted into the ferrule insertion hole inside the ferrule housing part 92B. Further, the head 22 inserted into the ferrule insertion hole inside the ferrule housing part 92B comes into abutment with the ferrule endface 71A. As described above, the cleaning element 1 extends across the pressing surface 22A of the head 22. Therefore, through the above operation, the cleaning element 1 is pressed onto the ferrule endface 71A. In one or more embodiments, the outer guide outer peripheral portion 63 of the outer guide part 60 is guided by the inner wall surface 92A of the receptacle housing 92 of the first optical receptacle 91, and thus the cleaning element 1 can be accurately pressed onto the ferrule endface 71A. Note that, as described above, owing to the configuration that the cleaning tool 10 according to one or more embodiments includes the head spring 25, the cleaning element 1 can be pressed onto the ferrule endface 71A on the pressing surface 22A of the head 22 with predetermined pressure.

When the operator further moves the cleaning tool 10 toward the first optical receptacle 91, as illustrated in FIG. 7B, the inner guide end surface 53 comes into abutment with the abutment portion 92C of the receptacle housing 92. In this state, when the cleaning tool 10 is further moved toward the first optical receptacle 91, the inner guide end surface 53 of the inner guide part 50 is pressed toward the rear side from the abutment portion 92C, and the inner guide part 50 thereby retracts with respect to the body housing 15, together with the moving member 17. In this manner, the moving member 17 relatively moves in the front-rear direction with respect to the body housing 15 inside the body housing 15. This relative movement allows collection of the cleaning element 1 and supply of an unused portion of the cleaning element 1 corresponding to the collected amount. In other words, the cleaning element 1 can be supplied and collected with a simple operation of pressing the extension part 20 of the cleaning tool 10 into a cleaning target (here, the abutment portion 92C of the first optical receptacle 91).

Figure 8A:
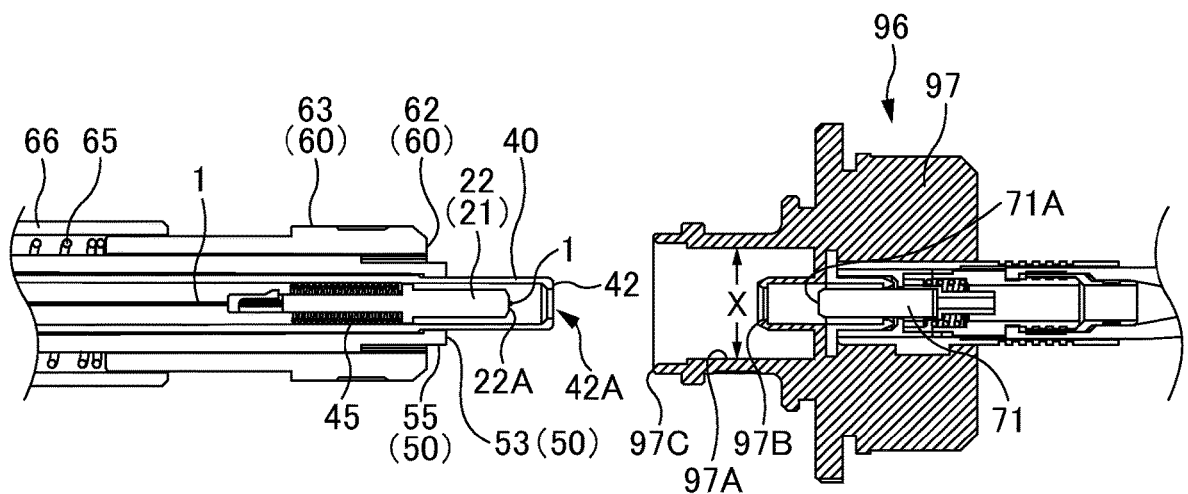
FIG. 8A to FIG. 8C are each a cross-sectional view illustrating a state of the cleaning tool 10 according to one or more embodiments at the time of cleaning a second optical receptacle 96 (state before the cleaning element 1 is pressed onto the ferrule endface 71A).
Figure 8B:
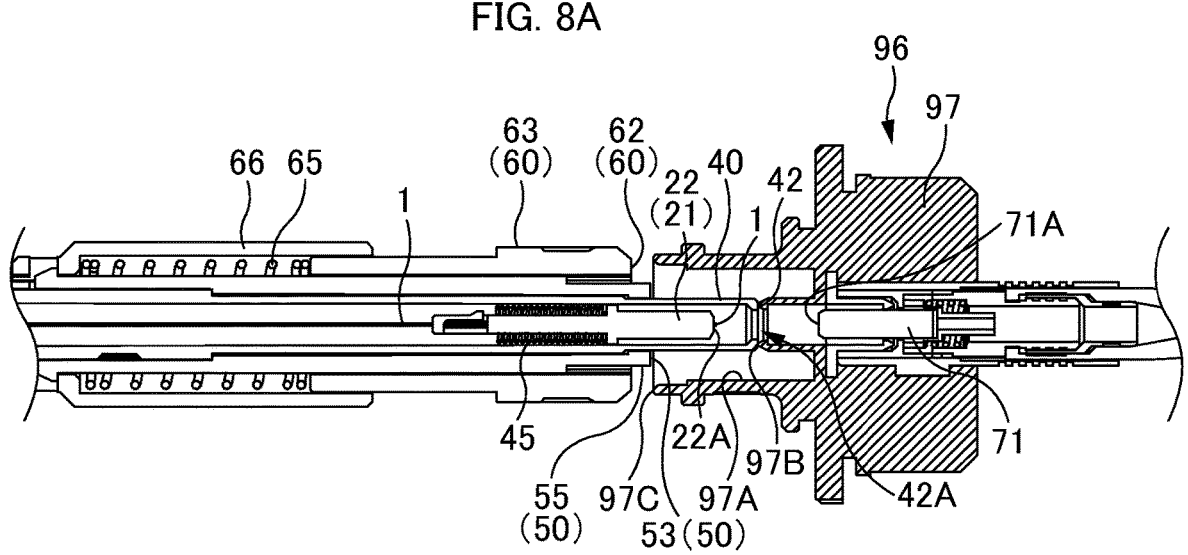
Figure 8C:
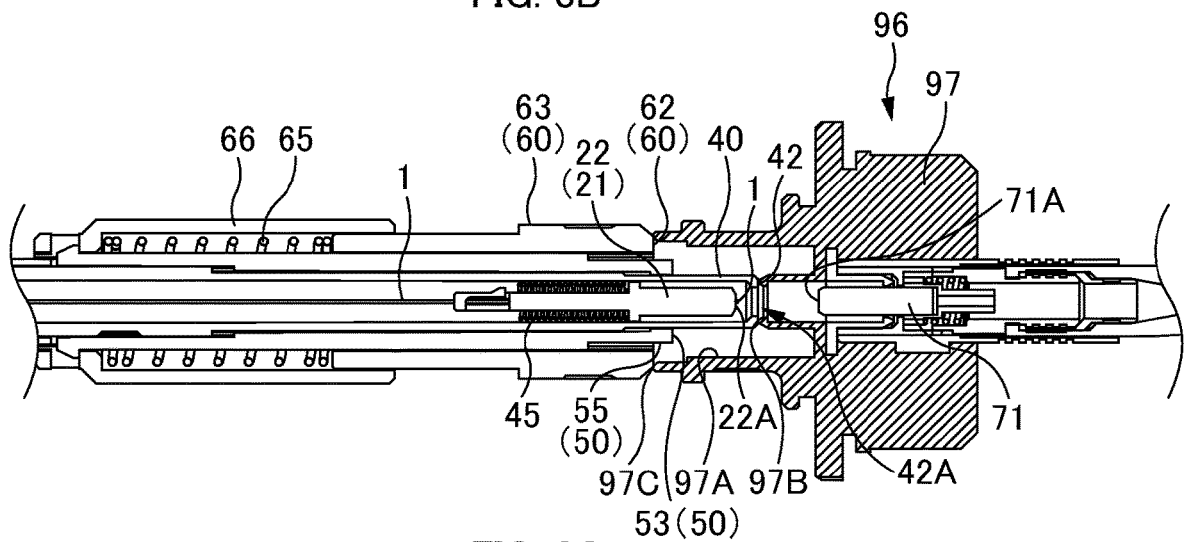

Procedure for Cleaning Second Optical Receptacle:

FIG. 8A to FIG. 8C are each a cross-sectional view illustrating a state of the cleaning tool 10 according to one or more embodiments at the time of cleaning the second optical receptacle 96 (state before the cleaning element 1 is pressed onto the ferrule endface 71A). FIG. 9A and FIG. 9B are each a cross-sectional view illustrating a state of the cleaning tool 10 according to one or more embodiments at the time of cleaning the second optical receptacle 96 (state after the cleaning element 1 is pressed onto the ferrule endface 71A). Note that a cross-sectional view in the arrow direction of FIG. 9A is illustrated in the upper part of FIG. 9A.

FIG. 8A is a diagram illustrating a state of the cleaning tool 10 and the second optical receptacle 96 before cleaning of the second optical receptacle 96 in one or more embodiments. In one or more embodiments, the shape of the inner surface of the receptacle housing 97 of the second optical receptacle 96 is different from that of the receptacle housing 92 of the first optical receptacle 91. The diameter of the inner surface of the receptacle housing 97 of the second optical receptacle 96 (see the part X of FIG. 8A) is smaller than the diameter of the inner surface of the receptacle housing 92 of the first optical receptacle 91 (see the part Y of FIG. 6A) (X<Y).

An operator of the cleaning operation moves the cleaning tool 10 toward the second optical receptacle 96 so that the pressing surface 22A of the head 22 (the plug-side guide end surface 42 of the plug-side guide part 40) of the cleaning tool 10 faces the ferrule endface 71A of the ferrule 71 of the second optical receptacle 96. At this time, as illustrated in FIG. 8B, the operator moves the cleaning tool 10 toward the second optical receptacle 96 so that the plug-side guide end surface 42 comes into abutment with a rear end surface of a ferrule housing part 97B.

When the operator further moves the cleaning tool 10 toward the second optical receptacle 96 in the state in which the plug-side guide end surface 42 comes into abutment with the rear end surface of the ferrule housing part 97B (see FIG. 8B), as illustrated in FIG. 8C, the outer guide end surface 62 of the outer guide part 60 comes into abutment with the housing end surface 97C of the receptacle housing 97. As described above, the diameter of the inner surface of the receptacle housing 97 of the second optical receptacle 96 (see the part X of FIG. 8A) is smaller than the diameter of the inner surface of the receptacle housing 92 of the first optical receptacle 91 (see the part Y of FIG. 6A) (X<Y). Therefore, the outer guide end surface 62 of the outer guide part 60 comes into abutment with the housing end surface 97C of the receptacle housing 97, with the outer guide part 60 not being fitted into the receptacle housing 97 of the second optical receptacle 96.

When the cleaning tool 10 is further moved toward the second optical receptacle 96 in the state in which the outer guide end surface 62 of the outer guide part 60 comes into abutment with the housing end surface 97C of the receptacle housing 97, the outer guide end surface 62 of the outer guide part 60 is pressed toward the rear side from the housing end surface 97C, and the outer guide part 60 thereby retracts with respect to the inner guide part 50. In this manner, as will be described later, an inner guide outer peripheral portion 55 of the inner guide part 50 exposed to the front side can be fitted into the inner wall surface 97A of the receptacle housing 97 of the second optical receptacle 96.

When the operator further moves the cleaning tool 10 toward the second optical receptacle 96 in the state in which the plug-side guide end surface 42 comes into abutment with the rear end surface of the ferrule housing part 97B (see FIG. 8B), the plug-side guide end surface 42 of the plug-side guide part 40 is pressed toward the rear side from the rear end surface of the ferrule housing part 97B, and the plug-side guide part 40 thereby retracts with respect to the head 22 and the inner guide part 50. When the plug-side guide part 40 retracts with respect to the head 22, the pressing surface 22A being an end surface of the head 22 is exposed to the front side further than the plug-side guide end surface 42. In this manner, in the state in which the plug-side guide end surface 42 comes into abutment with the rear end surface of the ferrule housing part 97B, the head 22 can be inserted into a ferrule insertion hole inside a sleeve holder end portion 82. In one or more embodiments, the inner guide outer peripheral portion 55 of the inner guide part 50 is guided by the inner wall surface 97C of the receptacle housing 97 of the second optical receptacle 96, and thus the head 22 can be accurately inserted into the ferrule insertion hole inside the ferrule housing part 97B.

Figure 9A:
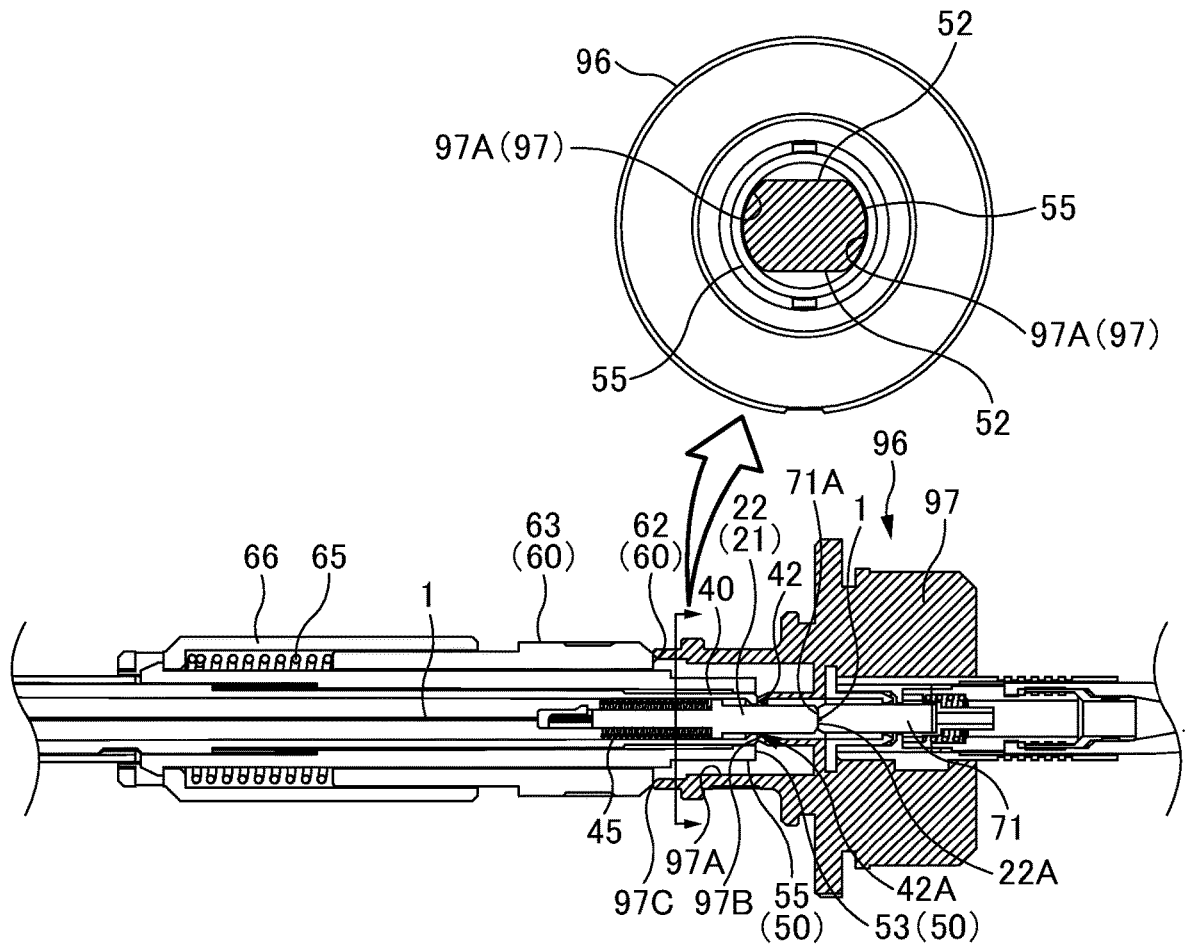
FIG. 9A and FIG. 9B are each a cross-sectional view illustrating a state of the cleaning tool 10 according to one or more embodiments at the time of cleaning the second optical receptacle 96 (state after the cleaning element 1 is pressed onto the ferrule endface 71A).
Figure 9B:
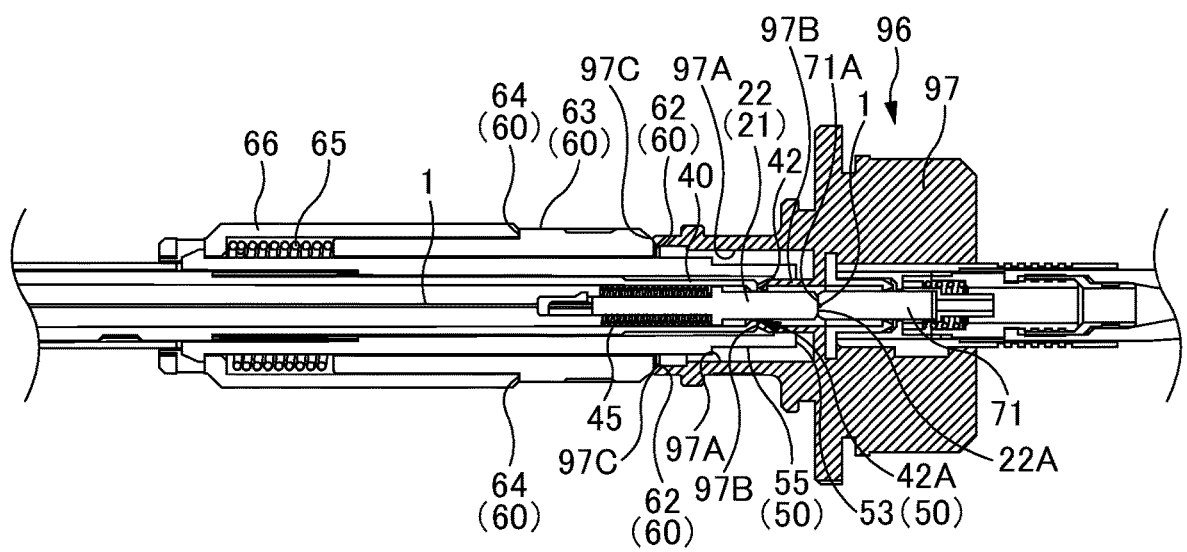

When the operator further moves the cleaning tool 10 toward the second optical receptacle 96, as illustrated in the upper part of FIG. 9A, the inner guide outer peripheral portion 55 of the inner guide part 50 is fitted into the inner wall surface 97A of the receptacle housing 97 of the second optical receptacle 96. At this time, the inner guide outer peripheral portion 55 serves as a guide surface when the head 22 is inserted into the ferrule insertion hole inside the ferrule housing part 97B. In this manner, the front end portion of the extension part 20 of the cleaning tool 10 is aligned to the second optical receptacle 96 in the up-down direction and the left-right direction (directions perpendicular to the front-rear direction). Therefore, the operator can accurately place the cleaning element 1 to face the ferrule endface 71A. Note that the end portion of the inner guide part 50 need not be fitted into the inner wall surface 97A of the receptacle housing 97 of the second optical receptacle 96, on the condition that the end portion serves as a guide when the cleaning element 1 is placed to face the ferrule endface 71A.

As illustrated in the lower part of FIG. 9A, the head 22 is inserted into the ferrule insertion hole inside the ferrule housing part 97B. Then, the head 22 inserted into the ferrule insertion hole inside the ferrule housing part 97B comes into abutment with the ferrule endface 71A. As described above, the cleaning element 1 extends across the pressing surface 22A of the head 22. Therefore, through the above operation, the cleaning element 1 is pressed onto the ferrule endface 71A. In one or more embodiments, the inner guide outer peripheral portion 55 of the inner guide part 50 is guided by the inner wall surface 97A of the receptacle housing 97 of the second optical receptacle 96, and thus the cleaning element 1 can be accurately pressed onto the ferrule endface 71A. Note that, as described above, owing to the configuration that the cleaning tool 10 according to one or more embodiments includes the head spring 25, the cleaning element 1 can be pressed onto the ferrule endface 71A on the pressing surface 22A of the head 22 with predetermined pressure.

Note that, in the guide unit 30 according to one or more embodiments, the outer spring 65 presses the outer guide part 60 toward the front side. Therefore, when the second optical receptacle 96 is not cleaned, the outer guide part 60 moves to the front side with respect to the inner guide part 50, and can clean the above-described first optical receptacle 91 again. Therefore, a separate attachment or the like need not be attached or removed depending on a cleaning target, irrespective of whether the cleaning target is the ferrule endface 71A inside the first optical receptacle 91 or the ferrule endface 71A inside the second optical receptacle 96. Therefore, reduction in operation efficiency of the entire cleaning operation due to the time and effort for the operation of attaching or removing the attachment can be prevented, and a ferrule endface of different types of optical adapters (optical connector receptacles) can be easily cleaned.

For example, when a plurality of guides is formed for one insertion portion (for example, the inner guide part 50) so as to be adapted to the shapes of connector housing holes of a plurality of types of optical receptacles, accuracy of placing the cleaning element 1 to face the ferrule endface 71A has hitherto been reduced in some cases due to formation of a gap that does not contribute to guiding. At the time of insertion into an optical receptacle including a connector housing hole having a large diameter (for example, the first optical receptacle in comparison with the second optical receptacle in one or more embodiments), the gap may be increased, and in particular, accuracy of placing the cleaning element 1 to face the ferrule endface 71A has hitherto been reduced. However, in one or more embodiments, the outer guide outer peripheral portion 63 serves as a guide surface at the time of cleaning the first optical receptacle, and the inner guide outer peripheral portion 55 serves as a guide surface at the time of cleaning the second optical receptacle. Consequently, reduction in accuracy of placing the cleaning element 1 to face the ferrule endface 71A can be prevented.

When the operator further moves the cleaning tool 10 toward the second optical receptacle 96, as illustrated in FIG. 9B, an abutment portion 64 of the outer guide part 60 comes into abutment with a front end portion of the outer spring receiving part 66. As described above, since the outer spring receiving part 66 is fixed to the inner guide part 50, the time point illustrated in FIG. 9B corresponds to a limit position at which the outer guide part 60 retracts with respect to the inner guide part 50, and the outer guide part 60 cannot retract with respect to the inner guide part 50 any further. In this case, when the outer guide end surface 62 of the outer guide part 60 is pressed toward the rear side from the housing end surface 97C of the receptacle housing 97, the inner guide part 50 retracts with respect to the body housing 15 through the outer spring receiving part 66, together with the moving member 17. In this manner, the moving member 17 relatively moves in the front-rear direction with respect to the body housing 15 inside the body housing 15. This relative movement allows collection of the cleaning element 1 and supply of an unused portion of the cleaning element 1 corresponding to the collected amount. In other words, the cleaning element 1 can be supplied and collected with a simple operation of pressing the extension part 20 of the cleaning tool 10 into a cleaning target (here, the ferrule endface 71A of the second optical receptacle 96). Note that, at the time point illustrated in FIG. 9B, the inner guide end surface 53 of the inner guide part 50 does not come into abutment with a deep portion of the inner wall surface 97A inside the receptacle housing 97 of the second optical receptacle 96. Therefore, in the cleaning tool 10 according to one or more embodiments, when the inner guide end surface 53 of the inner guide part 50 is pressed toward the rear side from the deep portion of the inner wall surface 97A, the inner guide part 50 does not retract with respect to the body housing 15.

Figure 10A:
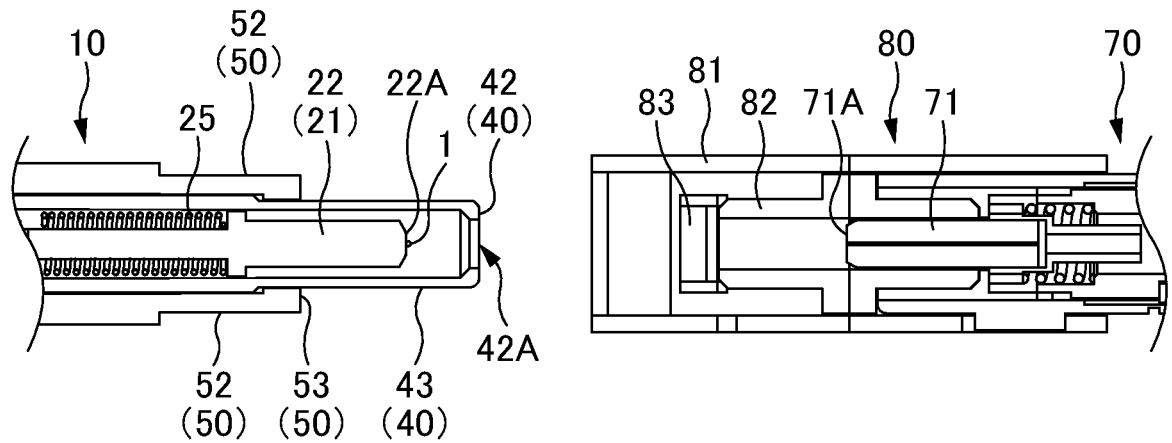
FIG. 10A to FIG. 10C are each a cross-sectional view illustrating a state of the cleaning tool 10 according to one or more embodiments at the time of cleaning an optical adapter 80 (state before an inner guide end surface 53 comes into abutment with a latch claw 83).
Figure 10B:
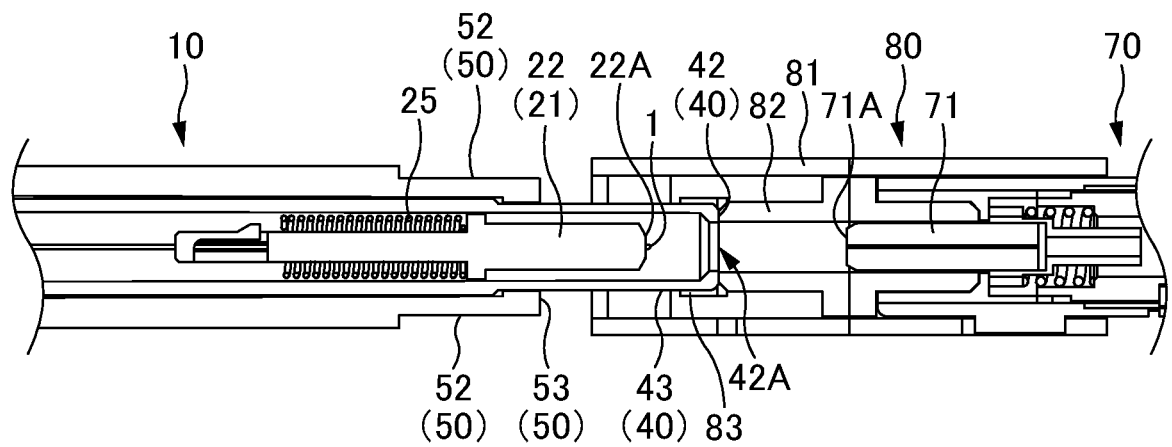
Figure 10C:
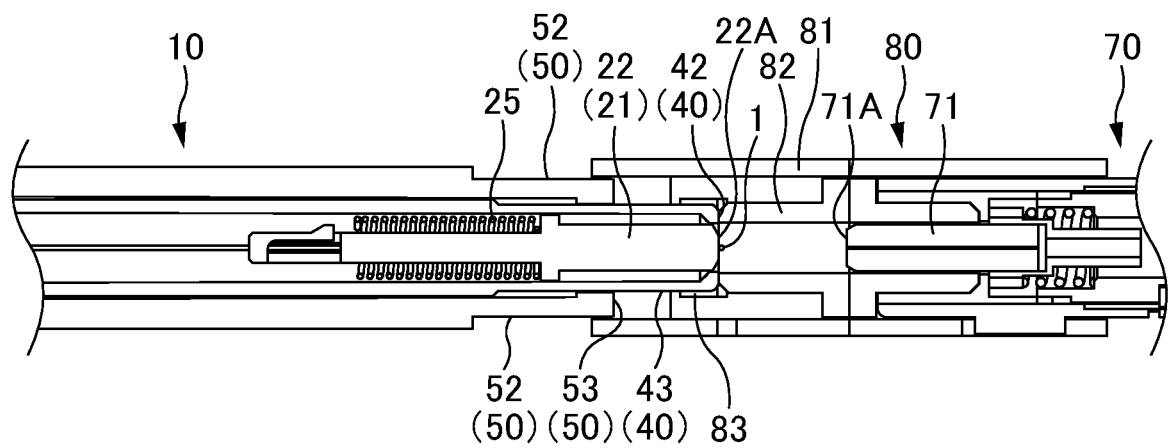
Figure 11A:
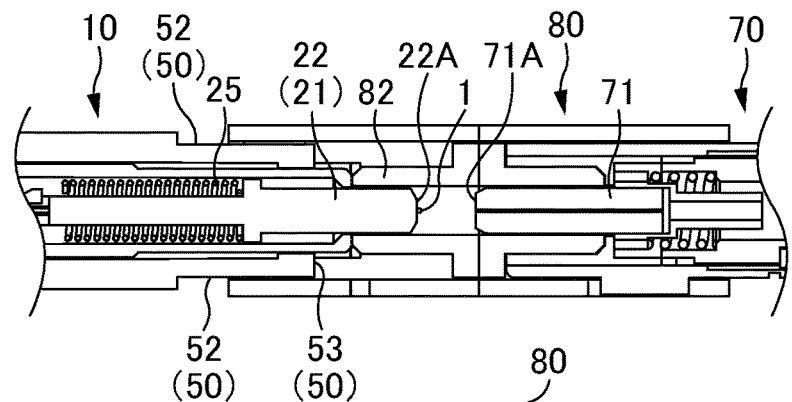
FIG. 11A and FIG. 11B are each a cross-sectional view illustrating a state of the cleaning tool 10 according to one or more embodiments at the time of cleaning the optical adapter 80 (state after the inner guide end surface 53 comes into abutment with the latch claw 83).
Figure 11B:
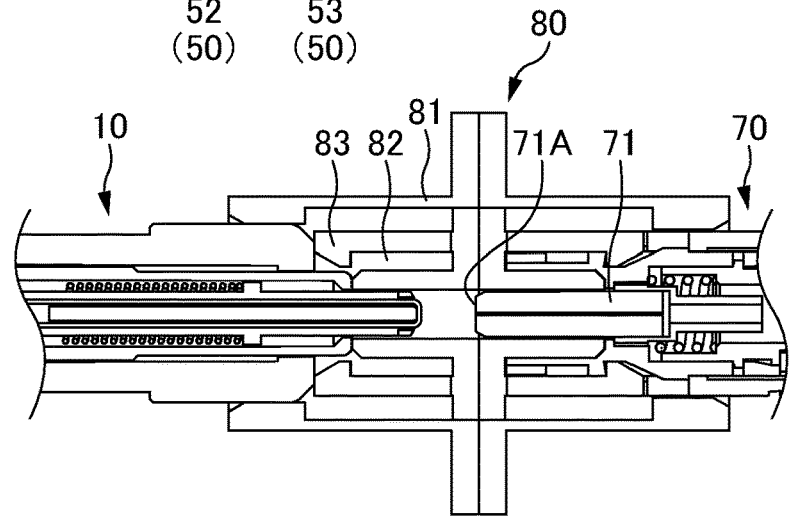
Figure 11B:
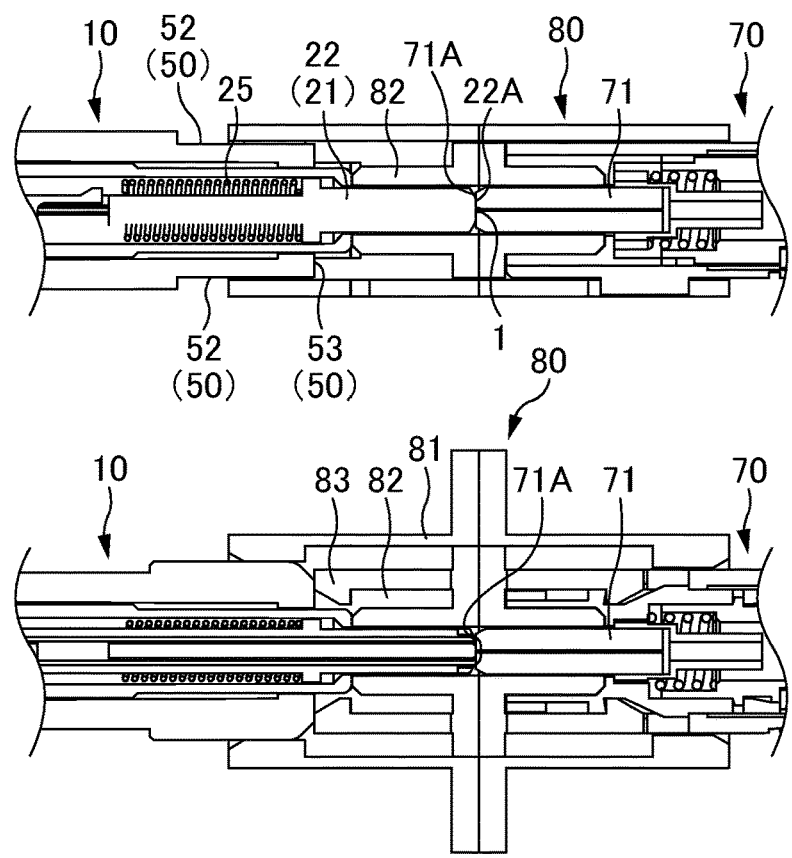

Procedure for Cleaning Optical Adapter:

FIG. 10A to FIG. 10C are each a cross-sectional view illustrating a state of the cleaning tool 10 according to one or more embodiments at the time of cleaning the optical adapter 80 (state before the inner guide end surface 53 comes into abutment with a latch claw 83). FIG. 11A and FIG. 11B are each a cross-sectional view illustrating a state of the cleaning tool 10 according to one or more embodiments at the time of cleaning the optical adapter 80 (state after the inner guide end surface 53 comes into abutment with the latch claw 83). Note that, also in FIG. 10A to FIG. 10C and FIG. 11A and FIG. 11B, illustration of the outer guide part 60, the outer spring 65, and the outer spring receiving part 66 is omitted. In each of FIG. 11A and FIG. 11B, a cross-sectional view taken along the plane perpendicular to the left-right direction is illustrated in the upper part of the figures, and a cross-sectional view taken along the plane perpendicular to the up-down direction is illustrated in the lower part of the figures.

FIG. 10A is a diagram illustrating a state of the cleaning tool 10 and the optical adapter 80 before cleaning of the optical adapter 80 in one or more embodiments. In one or more embodiments, regarding the optical adapter 80, when the optical plug 70 is inserted into the adapter housing 81, the ferrule 71 is inserted into the ferrule insertion hole inside the sleeve holder end portion 82. An operator of the cleaning operation moves the cleaning tool 10 toward the optical adapter 80 so that the pressing surface 22A of the head 22 (the plug-side guide end surface 42 of the plug-side guide part 40) of the cleaning tool 10 faces the ferrule endface 71A of the ferrule 71 of the optical adapter 80. At this time, as illustrated in FIG. 10B, the operator moves the cleaning tool 10 toward the optical plug 70 so that the plug-side guide end surface 42 comes into abutment with a rear end surface of the sleeve holder end portion 82.

When the operator further moves the cleaning tool 10 toward the optical adapter 80 in the state in which the plug-side guide end surface 42 abuts on the rear end surface of the sleeve holder end portion 82, the plug-side guide end surface 42 of the plug-side guide part 40 is pressed toward the rear side from the rear end surface of the sleeve holder end portion 82, and the plug-side guide part 40 thereby retracts with respect to the head 22 and the inner guide part 50. When the plug-side guide part 40 retracts with respect to the head 22, the pressing surface 22A being an end surface of the head 22 is exposed to the front side further than the plug-side guide end surface 42. In this manner, in the state in which the plug-side guide end surface 42 abuts on the rear end surface of the sleeve holder end portion 82, the head 22 can be inserted into the ferrule insertion hole inside the sleeve holder end portion 82.

Note that, in the guide unit 30 according to one or more embodiments, the plug-side spring 45 presses the plug-side guide part 40 toward the front side. Therefore, when not cleaning the optical adapter 80, the plug-side guide part 40 moves to the front side with respect to the head 22 and the inner guide part 50, and the above-described optical plug 70 can be cleaned again. Therefore, a separate attachment or the like need not be attached or removed depending on a cleaning target, irrespective of whether the cleaning target is the ferrule endface 71A inside the optical adapter 80 or the ferrule endface 71A of the optical plug 70. Therefore, reduction in operation efficiency of the entire cleaning operation due to the time and effort for the operation of attaching or removing the attachment can be prevented, and both the ferrule endface inside the optical adapter and the ferrule endface of the optical plug can be easily cleaned.

As illustrated in FIG. 10C, owing to the pair of upper and lower flat surfaces 52 of the inner guide part 50, the end portion of the inner guide part 50 is fitted into the inner wall surface 81B of the adapter housing 81 of the optical adapter 80. At this time, the flat surfaces 52 serve as guide surfaces when the head 22 is inserted into the ferrule insertion hole inside the sleeve holder end portion 82. The flat surfaces 52 also serve as guide surfaces when the cleaning element 1 is placed to face the ferrule endface 71A. In this manner, the front end portion of the extension part 20 of the cleaning tool 10 is aligned to the optical adapter 80 in the up-down direction and the left-right direction (directions perpendicular to the front-rear direction). In this manner, the cleaning element 1 can be accurately placed to face the ferrule endface 71A. Note that the end portion of the inner guide part 50 need not be fitted into the inner wall surface 81B of the adapter housing 81 of the optical adapter 80, on the condition that the end portion serves as a guide when the cleaning element 1 is placed to face the ferrule endface 71A.

When the operator further moves the cleaning tool 10 toward the optical adapter 80, as illustrated in FIG. 10A, the head 22 is inserted into the ferrule insertion hole inside the sleeve holder end portion 82. In one or more embodiments, the flat surfaces 52 of the inner guide part 50 are guided by the inner wall surface 81B of the adapter housing 81 of the optical adapter 80, and thus the head 22 can be accurately inserted into the ferrule insertion hole inside the sleeve holder end portion 82. The inner guide end surface 53 comes into abutment with a rear end surface of the latch claw 83. In this state, when the cleaning tool 10 is further moved toward the optical adapter 80, the inner guide end surface 53 of the inner guide part 50 is pressed toward the rear side from the latch claw 83, and the inner guide part 50 thereby retracts with respect to the body housing 15, together with the moving member 17. In this manner, the moving member 17 relatively moves in the front-rear direction with respect to the body housing 15 inside the body housing 15. This relative movement allows collection of the cleaning element 1 and supply of an unused portion of the cleaning element 1 corresponding to the collected amount. In other words, the cleaning element 1 can be supplied and collected with a simple operation of pressing the extension part 20 of the cleaning tool 10 into a cleaning target (here, the ferrule endface 71A of the optical adapter 80).

When the operator further moves the cleaning tool 10 toward the optical adapter 80, as illustrated in FIG. 10B, the head 22 inserted into the ferrule insertion hole inside the sleeve holder end portion 82 comes into abutment with the ferrule endface 71A. As described above, the cleaning element 1 extends across the pressing surface 22A of the head 22. Therefore, through the above operation, the cleaning element 1 is pressed onto the ferrule endface 71A. In one or more embodiments, the flat surfaces 52 of the inner guide part 50 are guided by the inner wall surface 81B of the adapter housing 81 of the optical adapter 80, and thus the cleaning element 1 can be accurately pressed onto the ferrule endface 71A. Note that, as described above, owing to the configuration that the cleaning tool 10 according to one or more embodiments includes the head spring 25, the cleaning element 1 can be pressed onto the ferrule endface 71A on the pressing surface 22A of the head 22 with predetermined pressure.

Figure 12A:
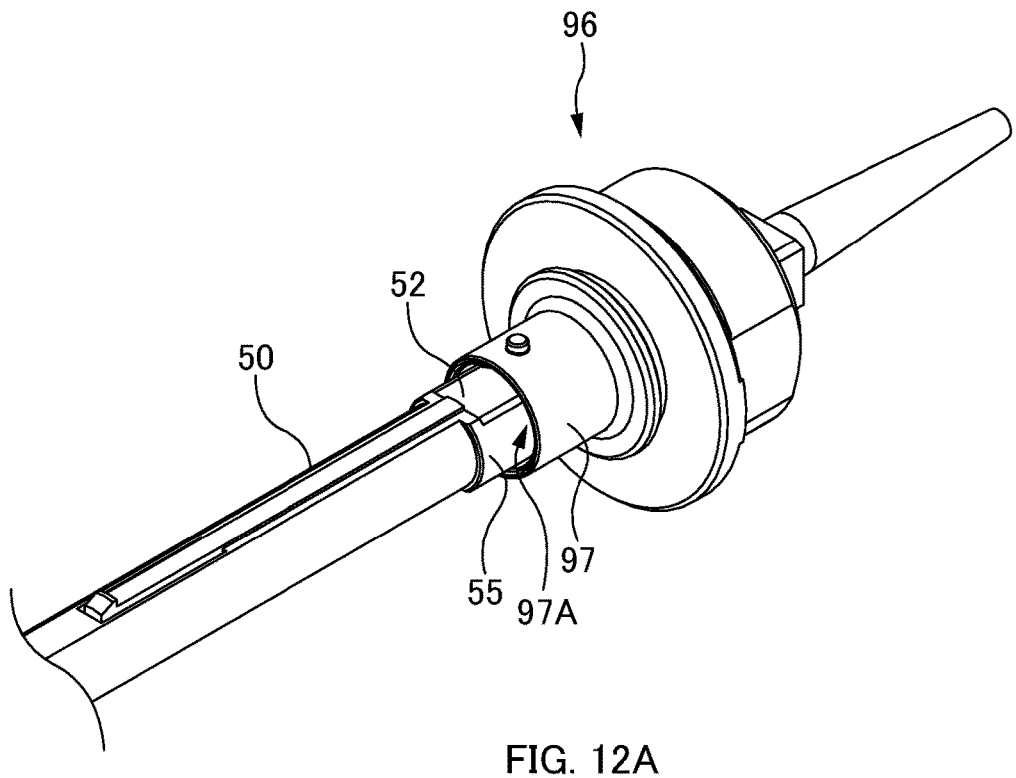
FIG. 12A is a perspective view illustrating a state in which an end portion of an inner guide part 50 of the cleaning tool 10 according to one or more embodiments is inserted into the second optical receptacle 96.
Figure 12B:
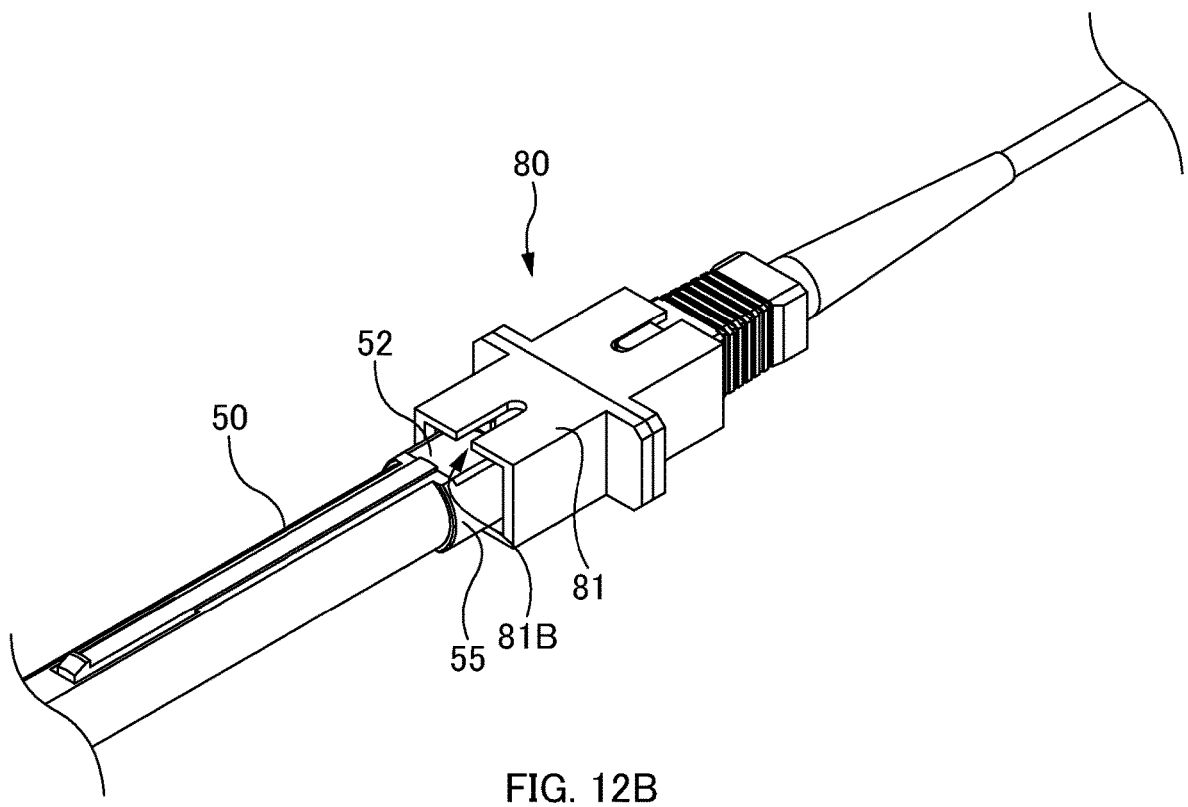
FIG. 12B is a perspective view illustrating a state in which the end portion of the inner guide part 50 of the cleaning tool 10 according to one or more embodiments is inserted into the optical adapter 80.

Hat Surfaces 52 of Inner Guide Part 50:

FIG. 12A is a perspective view illustrating a state in which the end portion of the inner guide part 50 of the cleaning tool 10 according to one or more embodiments is inserted into the second optical receptacle 96. FIG. 12B is a perspective view illustrating a state in which the end portion of the inner guide part 50 of the cleaning tool 10 according to one or more embodiments is inserted into the optical adapter 80. Note that, in FIG. 12A and FIG. 12B, for the sake of simplifying the description, illustration of the configuration other than the inner guide part 50 of the cleaning tool 10 is omitted.

As illustrated in FIG. 12A, the inner guide outer peripheral portion 55 of the inner guide part 50 is fitted into the inner wall surface 97A of the receptacle housing 97 of the second optical receptacle 96. At this time, the inner guide outer peripheral portion 55 serves as a guide surface when the cleaning element 1 is placed to face the ferrule endface 71A. As illustrated in FIG. 12B, owing to the pair of upper and lower flat surfaces 52 of the inner guide part 50, the end portion of the inner guide part 50 is fitted into the inner wall surface 81B of the adapter housing 81 of the optical adapter 80. At this time, the flat surfaces 52 also serve as guide surfaces when the cleaning element 1 is placed to face the ferrule endface 71A.

In the cleaning tool 10 according to one or more embodiments, the pair of flat surfaces 52 is formed at a front end portion of the inner guide part 50 in the up-down direction. The flat surfaces 52 are formed at upper and lower portions of the inner guide outer peripheral portion 55 of the inner guide part 50. Therefore, as illustrated in FIG. 12A and FIG. 12B, only by inserting the end portion of the inner guide part 50 of the cleaning tool 10 into a cleaning target (the second optical receptacle 96 or the optical adapter 80), both of the inner guide outer peripheral portion 55 and the flat surfaces 52 serve as guide surfaces when the cleaning element 1 is placed to face the ferrule endface 71A. In this manner, a ferrule endface of various types of optical connectors can be easily cleaned.

Figure 13:
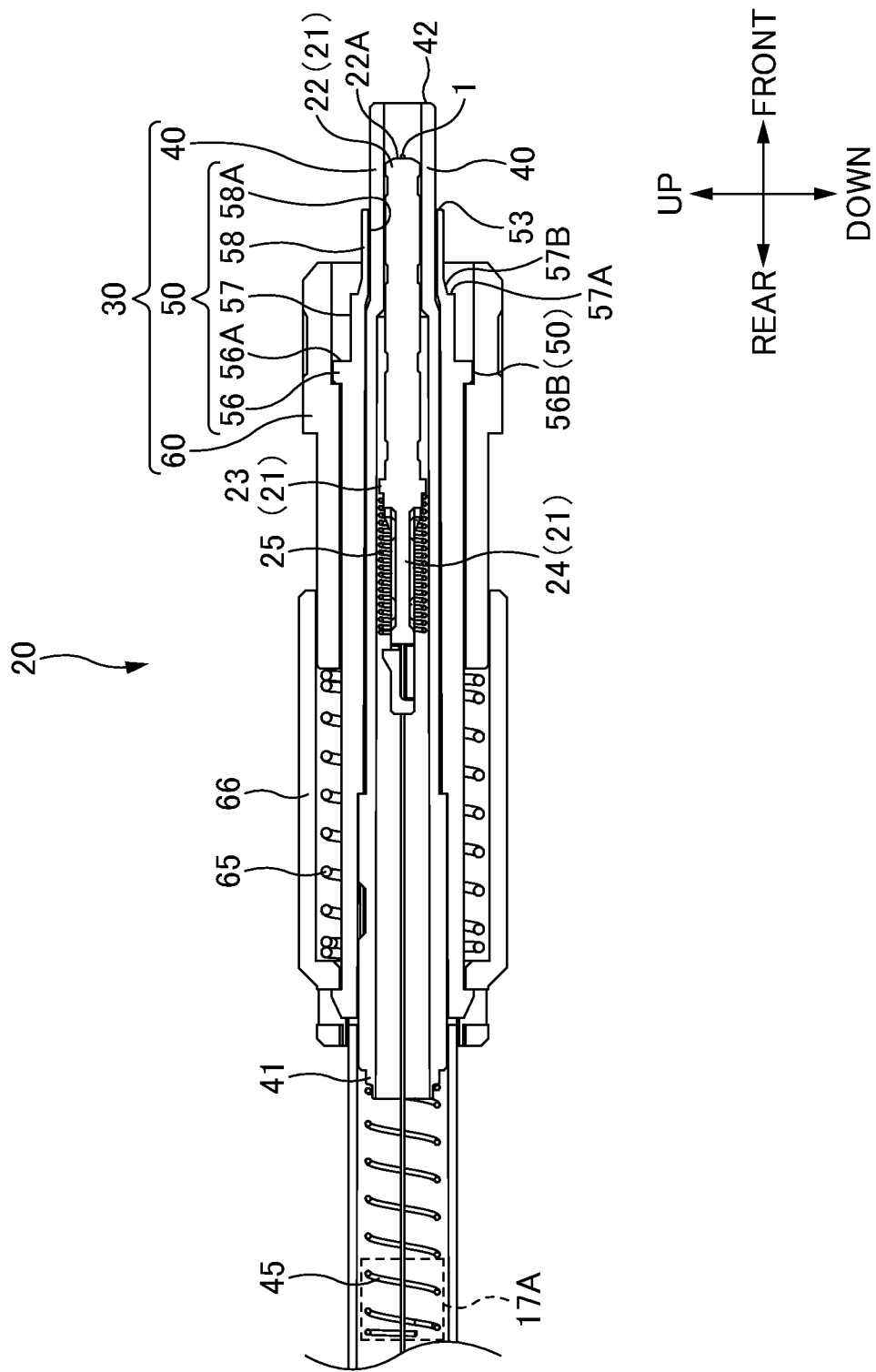
FIG. 13 is a cross-sectional view of an extension part 20 of a cleaning tool 10 according to one or more embodiments.

FIG. 13 is a cross-sectional view of an extension part 20 of a cleaning tool 10 according to one or more embodiments. As with one or more embodiments described above, also in the cleaning tool 10 of to one or more embodiments, the extension part 20 includes the head part 21, the head spring 25, and a guide unit 30. As with one or more embodiments described above, also in the cleaning tool 10 of to one or more embodiments, the guide unit 30 includes the plug-side guide part 40, the plug-side spring 45, an inner guide part 50, the outer guide part 60, the outer spring 65, and the outer spring receiving part 66.

In the cleaning tool 10 according to one or more embodiments, the shape of the extension part 20 may be different from the above. In the cleaning tool 10 according to one or more embodiments, a flange part 56 is provided in the inner guide part 50 (see FIG. 13). The flange part 56 is a part that guides the tip end of the extension part 20 of the cleaning tool 10 by being fitted into the inner side (inner wall surface 97A) of the receptacle housing 97 of the second optical receptacle 96 to be described later (see FIG. 15A). The flange part 56 is also a part that causes relative movement between the tool body 11 and the extension part 20 by coming into abutment with the adapter housing 81 of the optical adapter 80 to be described later and by being pressed with the adapter housing 81 (see FIG. 17B). The flange part 56 is a cylindrical part that projects further than other parts of the inner guide part 50. The inner circumference of the outer guide part 60 on the front side with respect to the flange part 56 has such a size as to allow the flange part 56 to be inserted therethrough. With this configuration, the inner guide part 50 is movable to the front side with respect to the outer guide part 60. On the other hand, the inner circumference of the outer guide part 60 on the rear side with respect to the flange part 56 has a size smaller than the outer circumference of the flange part 56. Therefore, when a rear end surface of the flange part 56 (a rear end surface that faces a flange part end surface 56A to be described later) comes into abutment with an inner wall of the outer guide part 60, the inner guide part 50 is prevented from being removed backward through the outer guide part 60.

The flange part 56 includes a flange part end surface 56A and a flange part outer peripheral surface 56B. The flange part end surface 56A is a part that causes relative movement between the tool body 11 and the extension part 20 by coming into abutment with the adapter housing 81 of the optical adapter 80 to be described later and by being pressed with the adapter housing 81 (see FIG. 17B). The flange part outer peripheral surface 56B is a part that guides the tip end of the extension part 20 of the cleaning tool 10 by being fitted into the inner side (inner wall surface 97A) of the receptacle housing 97 of the second optical receptacle 96 to be described later (see FIG. 15A).

In the cleaning tool 10 according to one or more embodiments, an intermediate tubular part 57 is provided in the inner guide part 50. The intermediate tubular part 57 is a part that guides the tip end of the extension part 20 of the cleaning tool 10 by being fitted into the inner side (inner wall surface 81B) of the adapter housing 81 of the optical adapter 80 to be described later (see FIG. 16C). The intermediate tubular part 57 is a cylindrical part provided between the flange part 56 and a tip end tubular part 58 to be described later.

Between the intermediate tubular part 57 and the tip end tubular part 58, an intermediate end surface 57A and an intermediate tapered surface 57B are provided. The intermediate end surface 57A and the intermediate tapered surface 57B are parts that cause relative movement between the tool body 11 and the extension part 20 by coming into abutment with the latch claw 83 of the optical adapter 80 to be described later and by being pressed by the latch claw 83 (see FIG. 17B). Note that the intermediate tapered surface 57B need not be provided.

Further, in the cleaning tool 10 according to one or more embodiments, the tip end tubular part 58 is provided in the inner guide part 50. The tip end tubular part 58 is also a member that causes relative movement between the tool body 11 and the extension part 20 by coming into abutment with a part of an optical connector (for example, the connector housing 72 of the optical plug 70) and by being pressed with the part of the optical connector. A front end surface of the tip end tubular part 58 serves as the inner guide end surface 53. A tip end inner peripheral surface 58A of the tip end tubular part 58 is provided so as to allow the sleeve holder end portion 82 of the optical adapter 80 to be fitted thereinto. The tip end inner peripheral surface 58A of the tip end tubular part 58 is provided so as to allow the ferrule housing part 92B (or the ferrule housing part 97B) of the first optical receptacle 91 (or the second optical receptacle 96) to be fitted thereinto. With this configuration, the tip end inner peripheral surface 58A of the tip end tubular part 58 can guide the tip end of the extension part 20 of the cleaning tool 10.

Figure 14A:
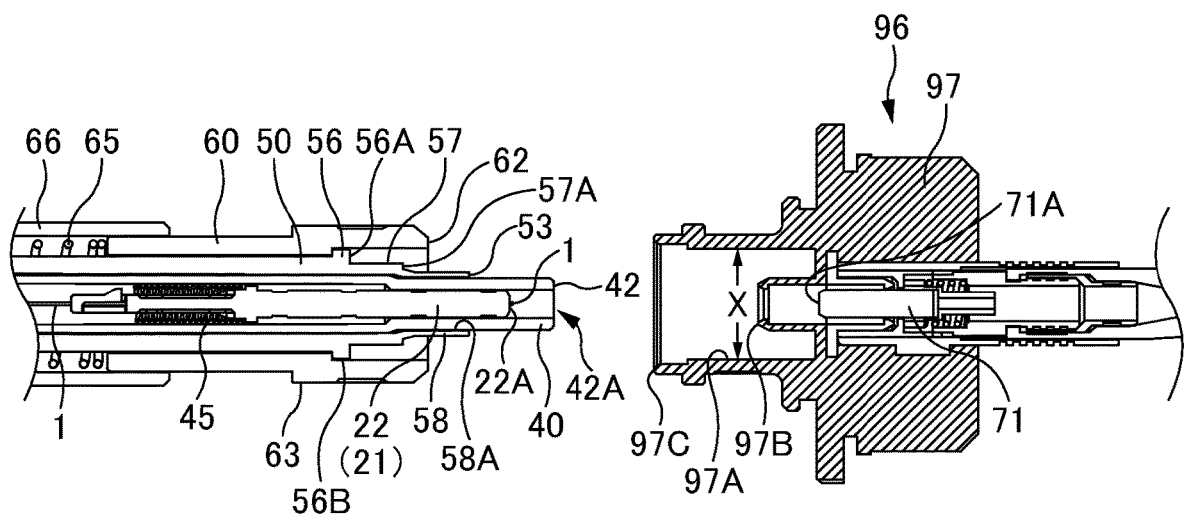
FIG. 14A to FIG. 14C are each a cross-sectional view illustrating a state of the cleaning tool 10 according to one or more embodiments at the time of cleaning the second optical receptacle 96 (state before the cleaning element 1 is pressed onto the ferrule endface 71A).
Figure 14B:
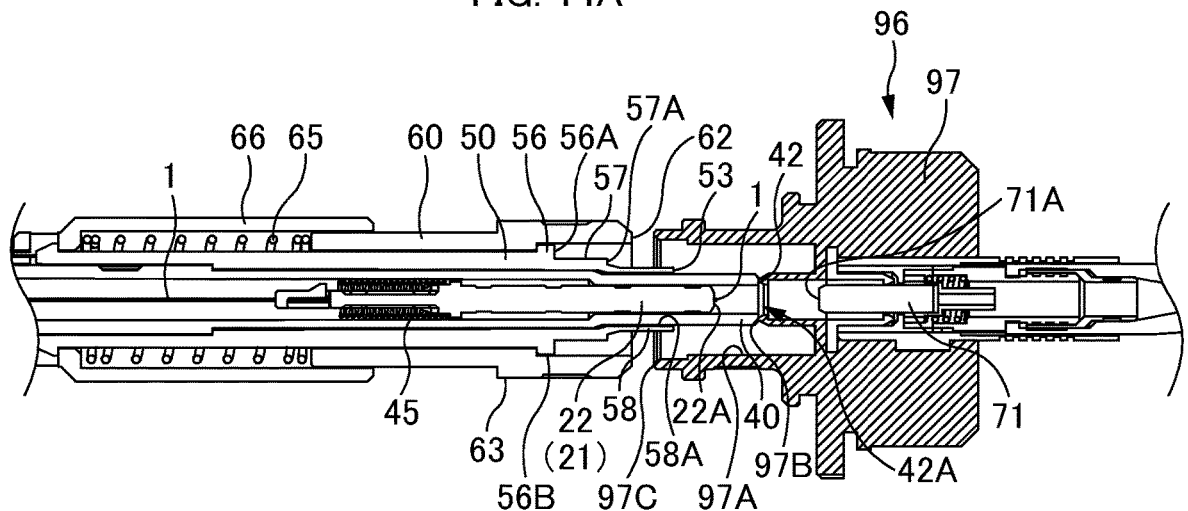
Figure 14C:
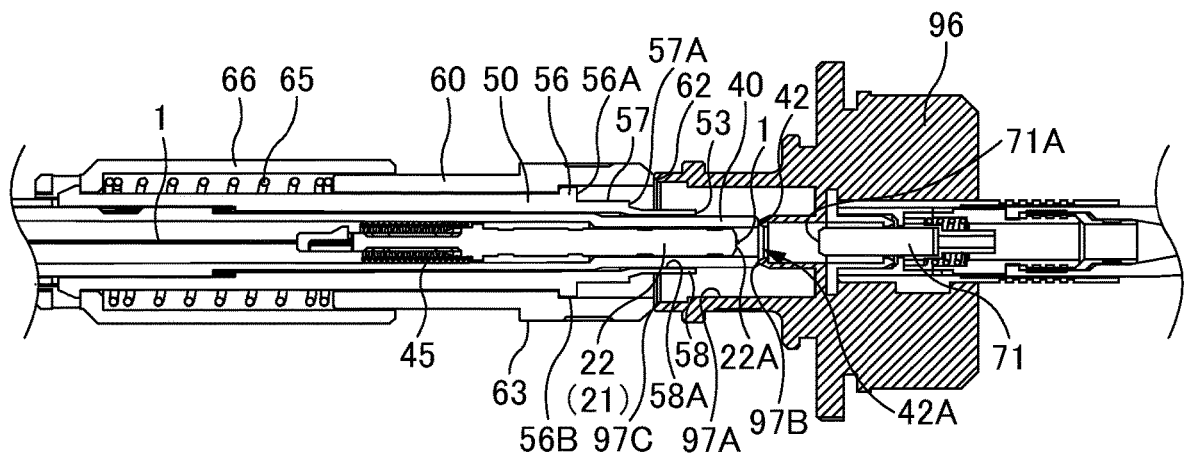
Figure 15A:
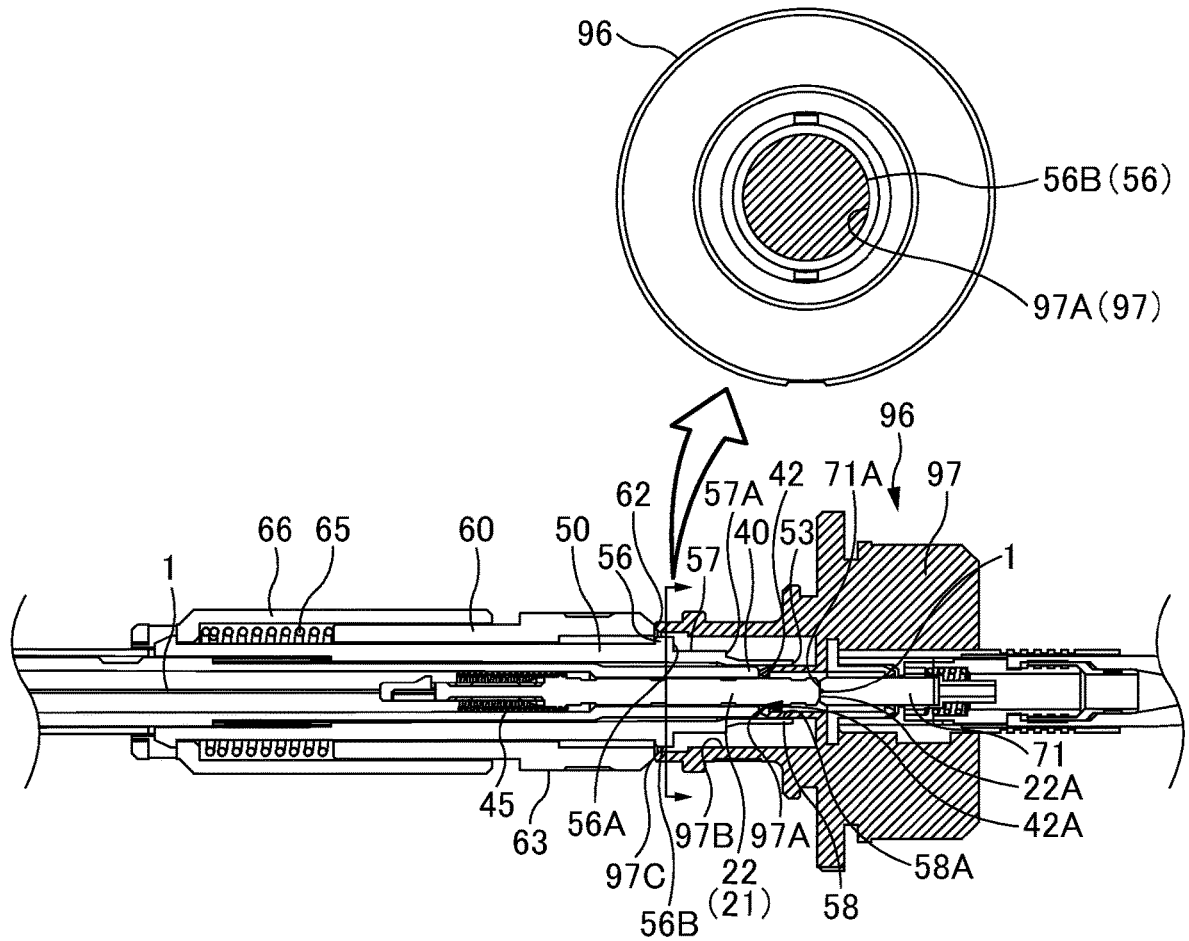
FIG. 15A and FIG. 15B are each a cross-sectional view illustrating a state of the cleaning tool 10 according to one or more embodiments at the time of cleaning the second optical receptacle 96 (state after the cleaning element 1 is pressed onto the ferrule endface 71A).
Figure 15B:
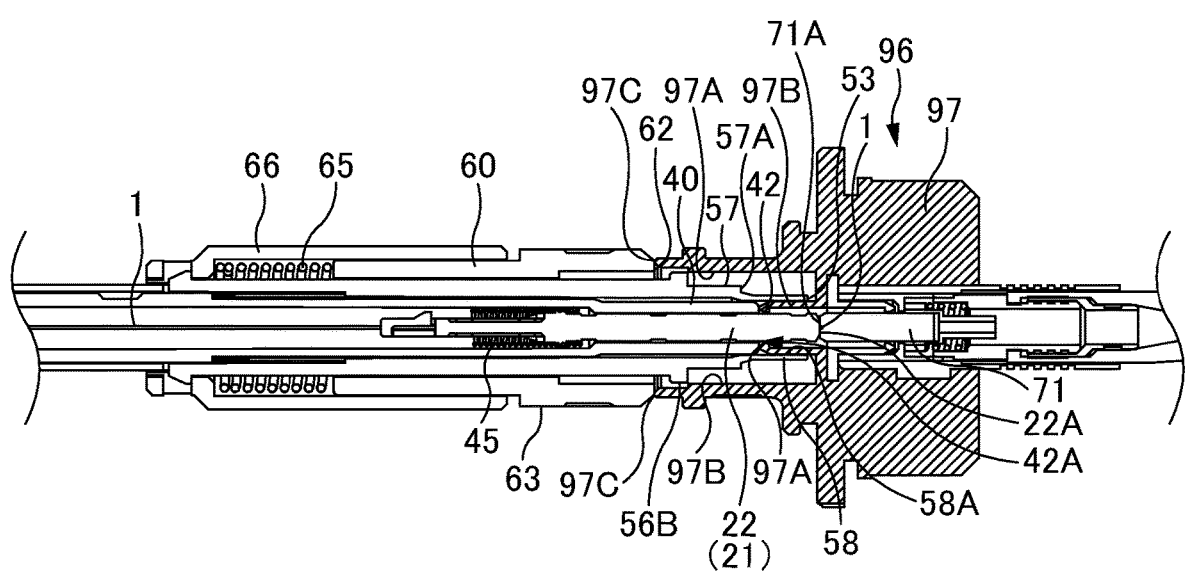

Procedure for Cleaning Second Optical Receptacle:

FIG. 14A to FIG. 14C are each a cross-sectional view illustrating a state of the cleaning tool 10 according to one or more embodiments at the time of cleaning the second optical receptacle 96 (state before the cleaning element 1 is pressed onto the ferrule endface 71A). FIG. 15A and FIG. 15B are each a cross-sectional view illustrating a state of the cleaning tool 10 according to one or more embodiments at the time of cleaning the second optical receptacle 96 (state after the cleaning element 1 is pressed onto the ferrule endface 71A). Note that a cross-sectional view in the arrow direction of FIG. 15A is illustrated in the upper part of FIG. 15A.

FIG. 14A is a diagram illustrating a state of the cleaning tool 10 and the second optical receptacle 96 before cleaning of the second optical receptacle 96 in one or more embodiments. The second optical receptacle 96 discussed below may be the same as the second receptacle of one or more embodiments described above. Specifically, the shape of the inner surface of the receptacle housing 97 of the second optical receptacle 96 is different from that of the receptacle housing 92 of the first optical receptacle 91 described above. The diameter of the inner surface of the receptacle housing 97 of the second optical receptacle 96 (see the part X of FIG. 14A) is smaller than the diameter of the inner surface of the receptacle housing 92 of the first optical receptacle 91 (see the part Y of FIG. 6A) (X<Y).

An operator of the cleaning operation moves the cleaning tool 10 toward the second optical receptacle 96 so that the pressing surface 22A of the head 22 (the plug-side guide end surface 42 of the plug-side guide part 40) of the cleaning tool 10 faces the ferrule endface 71A of the ferrule 71 of the second optical receptacle 96. At this time, as illustrated in FIG. 14B, the operator moves the cleaning tool 10 toward the second optical receptacle 96 so that the plug-side guide end surface 42 comes into abutment with a rear end surface of the ferrule housing part 97B.

When the operator further moves the cleaning tool 10 toward the second optical receptacle 96 in the state in which the plug-side guide end surface 42 abuts on the rear end surface of the ferrule housing part 97B (see FIG. 14B), as illustrated in FIG. 14C, the outer guide end surface 62 of the outer guide part 60 comes into abutment with the housing end surface 97C of the receptacle housing 97. As described above, the diameter of the inner surface of the receptacle housing 97 of the second optical receptacle 96 (see the part X of FIG. 14A) is smaller than the diameter of the inner surface of the receptacle housing 92 of the first optical receptacle 91 (see the part Y of FIG. 6A) (X<Y). Therefore, the outer guide end surface 62 of the outer guide part 60 comes into abutment with the housing end surface 97C of the receptacle housing 97, with the outer guide part 60 not being fitted into the receptacle housing 97 of the second optical receptacle 96.

When the cleaning tool 10 is further moved toward the second optical receptacle 96 in the state in which the outer guide end surface 62 of the outer guide part 60 abuts on the housing end surface 97C of the receptacle housing 97, the outer guide end surface 62 of the outer guide part 60 is pressed toward the rear side from the housing end surface 97C, and the outer guide part 60 thereby retracts with respect to the inner guide part 50. In this manner, as will be described later, the flange part outer peripheral surface 56B (flange part 56) of the inner guide part 50 exposed to the front side can be fitted into the inner wall surface 97A of the receptacle housing 97 of the second optical receptacle 96.

When the operator further moves the cleaning tool 10 toward the second optical receptacle 96 in the state in which the plug-side guide end surface 42 abuts on the rear end surface of the ferrule housing part 97B (see FIG. 14B), the plug-side guide end surface 42 of the plug-side guide part 40 is pressed toward the rear side from the rear end surface of the ferrule housing part 97B, and the plug-side guide part 40 thereby retracts with respect to the head 22 and the inner guide part 50. When the plug-side guide part 40 retracts with respect to the head 22, the pressing surface 22A being an end surface of the head 22 is exposed to the front side further than the plug-side guide end surface 42 (see FIG. 15A). In this manner, in the state in which the plug-side guide end surface 42 comes into abutment with the rear end surface of the ferrule housing part 97B, the head 22 can be inserted into the ferrule insertion hole inside the sleeve holder end portion 82 (see FIG. 15A). In one or more embodiments, the flange part outer peripheral surface 56B of the inner guide part 50 is guided by the inner wall surface 97A of the receptacle housing 97 of the second optical receptacle 96, and thus the head 22 can be accurately inserted into the ferrule insertion hole inside the ferrule housing part 97B.

When the operator further moves the cleaning tool 10 toward the second optical receptacle 96, as illustrated in the upper part of FIG. 15A, the flange part outer peripheral surface 56B (flange part 56) of the inner guide part 50 is fitted into the inner wall surface 97A of the receptacle housing 97 of the second optical receptacle 96. At this time, the flange part outer peripheral surface 56B serves as a guide surface when the head 22 is inserted into the ferrule insertion hole inside the ferrule housing part 97B. In this manner, the front end portion of the extension part 20 of the cleaning tool 10 is aligned to the second optical receptacle 96 in the up-down direction and the left-right direction (directions perpendicular to the front-rear direction). Therefore, the operator can accurately place the cleaning element 1 to face the ferrule endface 71A. Note that the flange part 56 of the inner guide part 50 need not be fitted into the inner wall surface 97A of the receptacle housing 97 of the second optical receptacle 96, on the condition that the flange part 56 serves as a guide when the cleaning element 1 is placed to face the ferrule endface 71A.

As illustrated in the lower part of FIG. 9A, the head 22 is inserted into the ferrule insertion hole inside the ferrule housing part 97B. Then, the head 22 inserted into the ferrule insertion hole inside the ferrule housing part 97B comes into abutment with the ferrule endface 71A. As described above, the cleaning element 1 extends across the pressing surface 22A of the head 22. Therefore, through the above operation, the cleaning element 1 is pressed onto the ferrule endface 71A. In one or more embodiments, the flange part outer peripheral surface 56B (flange part 56) of the inner guide part 50 is guided by the inner wall surface 97A of the receptacle housing 97 of the second optical receptacle 96, and thus the cleaning element 1 can be accurately pressed onto the ferrule endface 71A. Note that, as described above, owing to the configuration that the cleaning tool 10 according to one or more embodiments includes the head spring 25, the cleaning element 1 can be pressed onto the ferrule endface 71A on the pressing surface 22A of the head 22 with predetermined pressure.

Note that, in the guide unit 30 according to one or more embodiments, the outer spring 65 presses the outer guide part 60 toward the front side. Therefore, when not cleaning the second optical receptacle 96, the outer guide part 60 moves to the front side with respect to the inner guide part 50, and the above-described first optical receptacle 91 can be cleaned again. Therefore, a separate attachment or the like need not be attached or removed depending on a cleaning target, irrespective of whether the cleaning target is the ferrule endface 71A inside the first optical receptacle 91 or the ferrule endface 71A inside the second optical receptacle 96. Therefore, reduction in operation efficiency of the entire cleaning operation due to the time and effort for the operation of attaching or removing the attachment can be prevented, and a ferrule endface of different types of optical adapters (optical connector receptacles) can be easily cleaned.

For example, when a plurality of guides is formed for one insertion portion (for example, the inner guide part 50) so as to be adapted to the shapes of connector housing holes of a plurality of types of optical receptacles, accuracy of placing the cleaning element 1 to face the ferrule endface 71A has hitherto been reduced in some cases due to formation of a gap that does not contribute to guiding. At the time of insertion into an optical receptacle including a connector housing hole having a large diameter (for example, the first optical receptacle in comparison with the second optical receptacle in one or more embodiments), the gap may be increased, and in particular, accuracy of placing the cleaning element 1 to face the ferrule endface 71A has hitherto been reduced. However, in one or more embodiments, the outer guide outer peripheral portion 63 serves as a guide surface at the time of cleaning the first optical receptacle, and the flange part outer peripheral surface 56B serves as a guide surface at the time of cleaning the second optical receptacle. Consequently, reduction in accuracy of placing the cleaning element 1 to face the ferrule endface 71A can be prevented.

When the operator further moves the cleaning tool 10 toward the second optical receptacle 96, as illustrated in FIG. 15B, the plug-side guide end surface 42 of the plug-side guide part 40 is pressed toward the rear side from the ferrule housing part 97B of the second optical receptacle 96, and the plug-side guide part 40 thereby moves to the rear side with respect to the inner guide part 50. In this case, the spring receiving part 41 of the plug-side guide part 40 comes into abutment with the spring receiving part 17A of the moving member 17 (see FIG. 13 for the spring receiving part 41 of the plug-side guide part 40 and the spring receiving part 17A of the moving member 17). As described above, since the inner guide part 50 is fixed to the moving member 17, the time point when the spring receiving part 41 of the plug-side guide part 40 comes into abutment with the spring receiving part 17A of the moving member 17 corresponds to a limit position at which the plug-side guide part 40 retracts with respect to the inner guide part 50, and the plug-side guide part 40 cannot retract with respect to the inner guide part 50 any further. In this case, when the plug-side guide end surface 42 of the plug-side guide part 40 is pressed toward the rear side from the ferrule housing part 97B of the second optical receptacle 96, the plug-side guide part 40 retracts with respect to the body housing 15, together with the moving member 17. In this manner, the moving member 17 relatively moves in the front-rear direction with respect to the body housing 15 inside the body housing 15. This relative movement allows collection of the cleaning element 1 and supply of an unused portion of the cleaning element 1 corresponding to the collected amount. In other words, the cleaning element 1 can be supplied and collected with a simple operation of pressing the extension part 20 of the cleaning tool 10 into a cleaning target (here, the ferrule endface 71A of the second optical receptacle 96).

Note that, at the time point illustrated in FIG. 15B, the inner guide end surface 53 of the inner guide part 50 does not come into abutment with a deep portion of the inner wall surface 97A inside the receptacle housing 97 of the second optical receptacle 96. However, in the cleaning tool 10 according to one or more embodiments, when the inner guide end surface 53 of the inner guide part 50 comes into abutment with the deep portion of the inner wall surface 97A inside the receptacle housing 97 of the second optical receptacle 96 and is pressed toward the rear side from the deep portion of the inner wall surface 97A, the inner guide part 50 may retract with respect to the body housing 15. In other words, when the inner guide end surface 53 of the inner guide part 50 is pressed toward the rear side from the deep portion of the inner wall surface 97A, the moving member 17 may relatively move, inside the body housing 15, in the front-rear direction with respect to the body housing 15, and this relative movement may allow collection of the cleaning element 1 and supply of an unused portion of the cleaning element 1 corresponding to the collected amount.

Figure 16A:
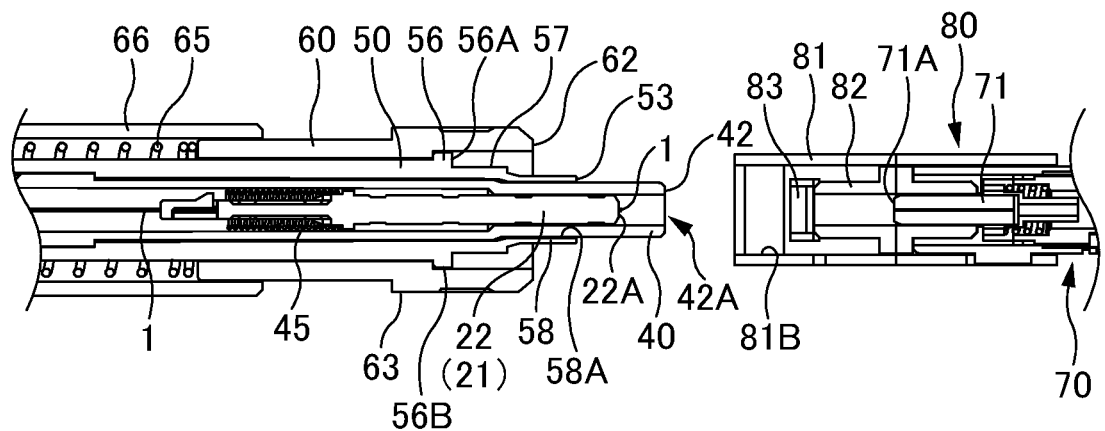
FIG. 16A to FIG. 16C are each a cross-sectional view illustrating a state of the cleaning tool 10 according to one or more embodiments at the time of cleaning the optical adapter 80 (state before the cleaning element 1 is pressed onto the ferrule endface 71A).
Figure 16B:
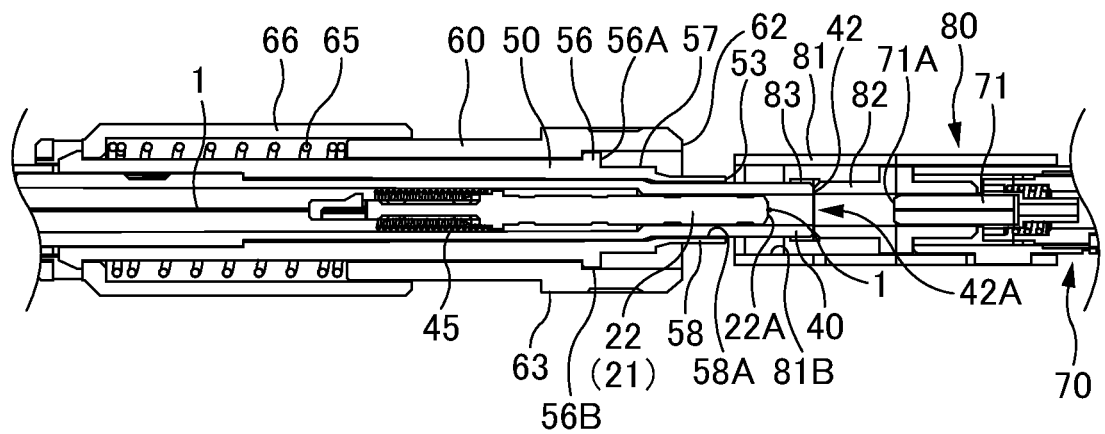
Figure 16C:
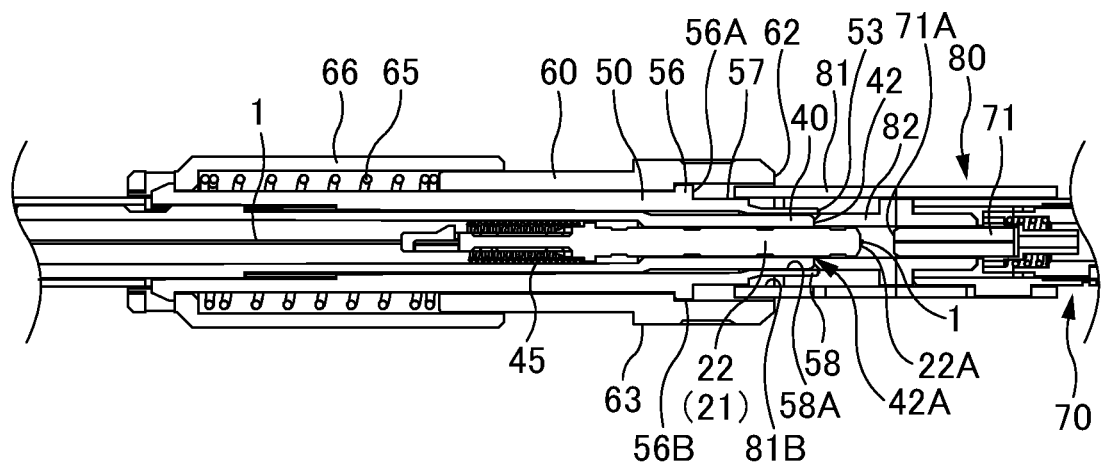

Procedure for Cleaning Optical Adapter:

FIG. 16A to FIG. 16C are each a cross-sectional view illustrating a state of the cleaning tool 10 according to one or more embodiments at the time of cleaning the optical adapter 80 (state before the cleaning element 1 is pressed onto the ferrule endface 71A). FIG. 17A and FIG. 17B are each a cross-sectional view illustrating a state of the cleaning tool 10 according to one or more embodiments at the time of cleaning the optical adapter 80 (state after the cleaning element 1 is pressed onto the ferrule endface 71A). Note that, in each of FIG. 17A and FIG. 17B, a cross-sectional view taken along the plane perpendicular to the left-right direction is illustrated in the upper part of the figures, and a cross-sectional view taken along the plane perpendicular to the up-down direction is illustrated in the lower part of the figures.

FIG. 16A is a diagram illustrating a state of the cleaning tool 10 and the optical adapter 80 before cleaning of the optical adapter 80 in one or more embodiments. In one or more embodiments, regarding the optical adapter 80, when the optical plug 70 is inserted into the adapter housing 81, the ferrule 71 is inserted into the ferrule insertion hole inside the sleeve holder end portion 82. An operator of the cleaning operation moves the cleaning tool 10 toward the optical adapter 80 so that the pressing surface 22A of the head 22 (the plug-side guide end surface 42 of the plug-side guide part 40) of the cleaning tool 10 faces the ferrule endface 71A of the ferrule 71 of the optical adapter 80. At this time, as illustrated in FIG. 16B, the operator moves the cleaning tool 10 toward the optical plug 70 so that the plug-side guide end surface 42 comes into abutment with a rear end surface of the sleeve holder end portion 82.

When the operator further moves the cleaning tool 10 toward the optical adapter 80 in the state in which the plug-side guide end surface 42 abuts on the rear end surface of the sleeve holder end portion 82, the plug-side guide end surface 42 of the plug-side guide part 40 is pressed toward the rear side from the rear end surface of the sleeve holder end portion 82, and the plug-side guide part 40 thereby retracts with respect to the head 22 and the inner guide part 50. When the plug-side guide part 40 retracts with respect to the head 22, the pressing surface 22A being an end surface of the head 22 is exposed to the front side further than the plug-side guide end surface 42. In this manner, in the state in which the plug-side guide end surface 42 abuts on the rear end surface of the sleeve holder end portion 82, the head 22 can be inserted into the ferrule insertion hole inside the sleeve holder end portion 82.

Note that, in the guide unit 30 according to one or more embodiments, the plug-side spring 45 presses the plug-side guide part 40 toward the front side. Therefore, when not cleaning the optical adapter 80, the plug-side guide part 40 moves to the front side with respect to the head 22 and the inner guide part 50, and the above-described optical plug 70 can be cleaned again. Therefore, a separate attachment or the like need not be attached or removed depending on a cleaning target, irrespective of whether the cleaning target is the ferrule endface 71A inside the optical adapter 80 or the ferrule endface 71A of the optical plug 70. Therefore, reduction in operation efficiency of the entire cleaning operation due to the time and effort for the operation of attaching or removing the attachment can be prevented, and both the ferrule endface inside the optical adapter and the ferrule endface of the optical plug can be easily cleaned.

As illustrated in FIG. 16C, owing to the intermediate tubular part 57 of the inner guide part 50, the inner guide part 50 is fitted into the inner wall surface 81B of the adapter housing 81 of the optical adapter 80. At this time, the intermediate tubular part 57 serves as a guide surface when the head 22 is inserted into the ferrule insertion hole inside the sleeve holder end portion 82. The intermediate tubular part 57 also serves as a guide surface when the cleaning element 1 is placed to face the ferrule endface 71A. In this manner, the front end portion of the extension part 20 of the cleaning tool 10 is aligned to the optical adapter 80 in the up-down direction and the left-right direction (directions perpendicular to the front-rear direction). In this manner, the cleaning element 1 can be accurately placed to face the ferrule endface 71A. Note that the end portion of the inner guide part 50 need not be fitted into the inner wall surface 81B of the adapter housing 81 of the optical adapter 80, on the condition that the end portion serves as a guide when the cleaning element 1 is placed to face the ferrule endface 71A.

In one or more embodiments described above, as illustrated in FIG. 10C, when the pair of upper and lower flat surfaces 52 of the inner guide part 50 is fitted into the inner wall surface 81B of the adapter housing 81 of the optical adapter 80, the flat surfaces 52 serve as guide surfaces when the head 22 is inserted into the ferrule insertion hole inside the sleeve holder end portion 82. The flat surfaces 52 also serve as guide surfaces when the cleaning element 1 is placed to face the ferrule endface 71A. Therefore, the extension part 20 of the cleaning tool 10 needs to be inserted into the optical adapter 80 in such a manner as to align the up-down direction (direction in which the pair of flat surfaces 52 is provided) to the up-down direction of the inner wall surface 81B of the adapter housing 81. However, in one or more embodiments, owing to the intermediate tubular part 57 provided around whole circumference of the inner guide part 50, the inner guide part 50 is fitted into the inner wall surface 81B of the adapter housing 81 of the optical adapter 80. Therefore, the operator can insert the extension part 20 into the optical adapter 80, without paying attention to the up-down direction of the cleaning tool 10.

When the operator further moves the cleaning tool 10 toward the optical adapter 80, as illustrated in FIG. 17A, the head 22 is inserted into the ferrule insertion hole inside the sleeve holder end portion 82. In one or more embodiments, the intermediate tubular part 57 of the inner guide part 50 is guided by the inner wall surface 81B of the adapter housing 81 of the optical adapter 80, and thus the head 22 can be accurately inserted into the ferrule insertion hole inside the sleeve holder end portion 82. Then, the head 22 inserted into the ferrule insertion hole inside the sleeve holder end portion 82 comes into abutment with the ferrule endface 71A. As described above, the cleaning element 1 extends across the pressing surface 22A of the head 22. Therefore, through the above operation, the cleaning element 1 is pressed onto the ferrule endface 71A. In one or more embodiments, the intermediate tubular part 57 of the inner guide part 50 is guided by the inner wall surface 81B of the adapter housing 81 of the optical adapter 80, and thus the cleaning element 1 can be accurately pressed onto the ferrule endface 71A. Note that, as described above, owing to the configuration that the cleaning tool 10 according to one or more embodiments includes the head spring 25, the cleaning element 1 can be pressed onto the ferrule endface 71A on the pressing surface 22A of the head 22 with predetermined pressure.

When the operator further moves the cleaning tool 10 toward the optical adapter 80, as illustrated in FIG. 17B, the intermediate end surface 57A of the inner guide part 50 comes into abutment with a rear end surface of the latch claw 83. In this state, when the cleaning tool 10 is further moved toward the optical adapter 80, the intermediate end surface 57A of the inner guide part 50 is pressed toward the rear side from the latch claw 83, and the inner guide part 50 thereby retracts with respect to the body housing 15, together with the moving member 17. In this manner, the moving member 17 relatively moves in the front-rear direction with respect to the body housing 15 inside the body housing 15. This relative movement allows collection of the cleaning element 1 and supply of an unused portion of the cleaning element 1 corresponding to the collected amount. In other words, the cleaning element 1 can be supplied and collected with a simple operation of pressing the extension part 20 of the cleaning tool 10 into a cleaning target (here, the ferrule endface 71A of the optical adapter 80).

Note that, at the time point illustrated in FIG. 17B, the inner guide end surface 53 of the inner guide part 50 does not come into abutment with the deep portion of the inner wall surface inside the adapter housing 81 of the optical adapter 80. However, in the cleaning tool 10 according to one or more embodiments, when the inner guide end surface 53 comes into abutment with the inner wall surface of the adapter housing 81 and is pressed toward the rear side from the deep portion of the inner wall surface 97A, the inner guide part 50 may retract with respect to the body housing 15. In this manner, the moving member 17 relatively moves in the front-rear direction with respect to the body housing 15 inside the body housing 15. This relative movement allows collection of the cleaning element 1 and supply of an unused portion of the cleaning element 1 corresponding to the collected amount. In other words, the cleaning element 1 can be supplied and collected with a simple operation of pressing the extension part 20 of the cleaning tool 10 into a cleaning target (here, the ferrule endface 71A of the optical adapter 80).

Other Cleaning Targets:

In the cleaning tool 10 according to one or more embodiments, as described above, the procedures for cleaning the second optical receptacle 96 and the optical adapter 80 have been described. Regarding other cleaning targets, for example, a procedure for cleaning the optical plug 70 (see FIG. 4A to FIG. 4C and FIG. 5A to FIG. 5C) and a procedure for cleaning the first optical receptacle 91 (see FIG. 6A to FIG. 6C and FIG. 7A and FIG. 7B) may be similar to those of the embodiments described above.

Summary

The cleaning tool 10 of the embodiments described above includes the tool body 11, and the extension part 20 including the head 22. The extension part 20 includes the inner guide part 50 through which the head 22 is inserted, and the outer guide part 60 through which the inner guide part is inserted. Further, in the embodiments described above, in the case of cleaning of the first optical receptacle 91 (corresponding to the first optical connector), as illustrated in FIG. 6B, the outer guide outer peripheral portion 63 of the outer guide part 60 guides the head 22 with respect to the ferrule endface 71A of the first optical receptacle 91. At the time of cleaning of the second optical receptacle 96 (corresponding to the second optical connector) with a housing having a different shape from a shape of a housing of the first optical receptacle 91, as illustrated in FIG. 9A (or FIG. 15A), the outer guide part 60 retracts and the inner guide part 50 is exposed to the front side (second optical connector side), so that the inner guide outer peripheral portion 55 of the inner guide part 50 (or the flange part outer peripheral surface 56B of the flange part 56) guides the head 22 with respect to the ferrule endface 71A of the second optical receptacle 95. With this configuration, in the embodiments described above, cleaning operation for the first optical receptacle 91 and the second optical receptacle 96 having different shapes from each other can be easily performed.

In the cleaning tool 10 of the embodiments described above, the first optical receptacle 91 (corresponding to the first optical connector) and the second optical receptacle 96 (corresponding to the second optical connector) are each an optical receptacle, into which an optical plug is inserted from one side so that the optical plug is optically connected with an inside optical connector (ferrule), and the shape of the inner surface of the housing of the first optical receptacle 91 and the shape of the inner surface of the housing of the second optical receptacle 96 are different from each other. In other words, the shape of the inner surface of the receptacle housing 92 of the first optical receptacle 91 and the shape of the inner surface of the receptacle housing 97 of the second optical receptacle 96 are different from each other. With this configuration, in the embodiments described above, cleaning operation for the first optical receptacle 91 and the second optical receptacle 96 having different diameters of connector housing holes can be easily performed.

In the cleaning tool 10 of the embodiments described above, in the case of cleaning of the second optical receptacle 96 (corresponding to the second optical connector), as illustrated in FIG. 8C and FIG. 9A (or FIG. 14C and FIG. 15A), the outer guide part 60 is retracted by pressing the outer guide end surface 62 of the outer guide part 60 on the second optical receptacle 96 side onto the housing end surface 97C of the receptacle housing 97 of the second optical receptacle 96. With this configuration, in the embodiments described above, the inner guide outer peripheral portion 55 of the inner guide part 50 (or the flange part outer peripheral surface 56B of the flange part 56) exposed toward the second optical receptacle 96 side can be guided to the inner wall surface 97A of the receptacle housing 97 of the second optical receptacle 96.

In the cleaning tool 10 of the embodiments described above, the flat surface(s) 52 are formed at an outer peripheral portion of the inner guide part 50. With this configuration, in the embodiments described above, the ferrule endface of various types of optical connectors can be easily cleaned.

In the cleaning tool 10 of the embodiments described above, the extension part 20 may be movable in a predetermined direction (front-rear direction) with respect to the tool body 11, and the cleaning tool 10 further include the feeding mechanism 12 that utilizes relative movement between the tool body 11 and the extension part 20 to supply the cleaning element 1 to the pressing surface 22A of the head 22 and collect the cleaning element 1 on the pressing surface 22A. With this configuration, in the embodiments described above, the cleaning element 1 can be supplied and collected with a simple operation.

In the cleaning tool 10 of the embodiments described above, in the case of cleaning of the first optical receptacle 91 (corresponding to the first optical connector), as illustrated in FIG. 7B, the relative movement between the tool body 11 and the extension part 20 may be caused by pressing the inner guide end surface 53 of the inner guide part 50 on the first optical receptacle 91 side onto the receptacle housing 92 of the first optical receptacle 91. With this configuration, in the embodiments described above, the cleaning element 1 can be supplied and collected with a simple operation.

In the cleaning tool 10 of the embodiments described above, in the case of cleaning of the second optical receptacle 96 (corresponding to the second optical connector), as illustrated in FIG. 15B, the relative movement between the tool body 11 and the extension part 20 may be caused by pressing the plug-side guide end surface 42 of the plug-side guide part 40 on the second optical receptacle 96 side onto the receptacle housing 97 of the second optical receptacle 96. With this configuration, in the embodiments described above, the cleaning element 1 can be supplied and collected with a simple operation.

The cleaning tool 10 of the embodiments described above includes the tool body 11, and the extension part 20 including the head 22. The extension part 20 includes the plug-side guide part 40 through which the head 22 is inserted. Further, in one or more embodiments described above, in the case of cleaning of the optical plug 70, as illustrated in FIG. 4A, the plug-side guide end surface 42 of the plug-side guide part 40 projects further toward the optical plug 70 than the pressing surface 22A of the head 22. In the case of cleaning of the optical adapter 80 to which the optical plug 70 is connected, as illustrated in FIG. 11A (or FIG. 17A), the plug-side guide part 40 retracts, and the pressing surface 22A of the head 22 is exposed toward the optical adapter 80. With this configuration, in the embodiments described above, both the ferrule endface 71A inside the optical adapter 80 and the ferrule endface 71A of the optical plug 70 can be easily cleaned.

In the cleaning tool 10 of the embodiments described above, as illustrated in FIG. 4C, the plug-side guide outer peripheral portion 43 of the plug-side guide part 40 is provided so as to guide the head 22 with respect to the ferrule endface 71A of the optical plug 70. With this configuration, in the embodiments described above, the cleaning element 1 can be accurately placed to face the ferrule endface 71A.

In the cleaning tool 10 of the embodiments described above, the inside of the plug-side guide part 40 is provided so as to allow the ferrule 71 of the optical plug 70 to be inserted thereinto. With this configuration, in the embodiments described above, the cleaning element 1 can be accurately placed to face the ferrule endface 71A.

In the cleaning tool 10 of the embodiments described above, in the case of cleaning of the optical plug 70, as illustrated in FIG. 5B, the plug-side guide part 40 is retracted by pressing the plug-side guide end surface 42 of the plug-side guide part 40 on the optical plug 70 side onto the abutment surface 72C of the connector housing 72 of the optical plug 70. With this configuration, in the embodiments described above, the end surface of the inner guide part 50 on the optical plug 70 side can be pressed onto the connector housing 72 of the optical plug 70.

In the cleaning tool 10 of the embodiments described above, the extension part 20 is movable in a predetermined direction (front-rear direction) with respect to the tool body 11, and the cleaning tool 10 further includes the feeding mechanism 12 that utilizes relative movement between the tool body 11 and the extension part 20 to supply the cleaning element 1 to the pressing surface 22A of the head 22 and collect the cleaning element 1 on the pressing surface 22A. With this configuration, in the embodiments described above, the cleaning element 1 can be supplied and collected with a simple operation.

In the cleaning tool 10 of the embodiments described above, the extension part 20 further includes the inner guide part 50 (corresponding to the adapter-side guide part) allowing the plug-side guide part 40 to be inserted through the inner guide part 50, and in the case of cleaning of the optical plug 70, as illustrated in FIG. 5C, the relative movement between the tool body 11 and the extension part 20 is caused by pressing the inner guide end surface 53 of the inner guide part 50 on the optical plug 70 side onto the end surface 72A of the connector housing 72 of the optical plug 70. With this configuration, in the embodiments described above, the cleaning element can be supplied and collected with a simple operation.

In the cleaning tool 10 of the embodiments described above, the extension part 20 further includes the inner guide part 50 (corresponding to the adapter-side guide part) allowing the plug-side guide part 40 to be inserted through the inner guide part 50, and in the case of cleaning of the optical adapter 80, as illustrated in FIG. 10C and FIG. 12B, the flat surface(s) 52 of the inner guide outer peripheral portion 55 of the inner guide part 50 are provided so as to guide the head 22 with respect to the ferrule endface 71 of the optical plug 70 connected to the optical adapter 80. With this configuration, in the embodiments described above, the cleaning element 1 can be accurately placed to face the ferrule endface 71A.

In the cleaning tool 10 of the embodiments described above, in the case of cleaning of the optical adapter 80, as illustrated in FIG. 11A, the relative movement between the tool body 11 and the extension part 20 is caused by pressing the inner guide end surface 53 of the inner guide part 50 (corresponding to the adapter-side guide part) toward the optical adapter 80 onto the sleeve holder end portion 82 of the optical adapter 80. With this configuration, in the embodiments described above, the cleaning element can be supplied and collected with a simple operation.

In the cleaning tool 10 of the embodiments described above, the extension part 20 further includes the plug-side spring 45 that urges the plug-side guide part 40 toward the optical plug 70. With this configuration, in the embodiments described above, both the ferrule endface 71A inside the optical adapter 80 and the ferrule endface 71A of the optical plug 70 can be easily cleaned.

Other Embodiments

In the foregoing embodiments, the cleaning tool 10 includes the plug-side guide part 40 and the plug-side spring 45, but may not include these. In this case, the optical plug 70 is excluded from cleaning targets. However, even with the cleaning tool 10 having such a configuration, cleaning operation for the first optical receptacle 91 and the second optical receptacle 96 having different shapes from each other can be easily performed, as long as the cleaning tool 10 has the configuration that the outer guide part 60 retracts and the inner guide part 50 is exposed to the front side, so that the inner guide outer peripheral portion 55 of the inner guide part 50 guides the head 22 with respect to the ferrule endface 71A of the second optical receptacle 95.

In the foregoing embodiments, the cleaning tool 10 includes the outer guide part 60, the outer spring 65, and the outer spring receiving part 66, but may not include these. In this case, the first optical receptacle 91 is excluded from cleaning targets. However, even with the cleaning tool 10 having such a configuration, the cleaning operation for both inside the optical adapter 80 and the cleaning operation for the optical plug 70 can be easily performed, as long as the cleaning tool 10 has the configuration that the plug-side guide part 40 retracts and the pressing surface 22A of the head 22 is exposed to the front side, so that the head 22 is inserted into the ferrule insertion hole inside the sleeve holder end portion 82 of the optical adapter 80.

In the foregoing embodiments, the outer guide part 60 serves as a guide member in the case of cleaning the first optical receptacle, and the inner guide part 50 serves as a guide member in the case of cleaning the second optical receptacle. However, when another guide member is provided further outside the outer guide member, an optical receptacle having a shape of an inner surface different from that of the first optical receptacle and the second optical receptacle (having a diameter of a housing inner surface larger than that of the first optical receptacle and the second optical receptacle) can be a cleaning target.

The ferrule 71 of the optical receptacle 90 may hold a single-core optical fiber, or may hold a multi-core optical fiber.

In the foregoing embodiments, as a cleaning target, the ferrule 71 of the optical plug 70 is a cylindrical ferrule, but may be a rectangular ferrule. For example, the ferrule 71 of the optical plug 70 may be a so-called MT ferrule (F12-type multi-core optical fiber connector specified in JIS C 5981). The ferrule 71 of the optical plug 70 may hold a single-core optical fiber, or may hold a multi-core optical fiber.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Cleaning element;
10: Cleaning tool;
11: Tool body;
12: Feeding mechanism;
13: Supply reel;
14: Take-up reel;
15: Body housing;
16A, 16B: Spring receiving part;
17: Moving member;
17A: Spring receiving part;
18: Coil spring;
19: Rotating member;
19A: Rotary tubular part;
19B: Head support part;
19C: Insertion protrusion;
19D: Cam groove;
20: Extension part;
21: Head part;
22: Head;
22A: Pressing surface;
23: Flange section;
24: Proximal end portion;
25: Head spring;
30: Guide unit;
40: Plug-side guide part;
41: Spring receiving part;
42: Plug-side guide end surface;
42A: Insertion hole;
43: Plug-side guide outer peripheral portion;
45: Plug-side spring;
50: Inner guide part (adapter-side guide part);
51: Insertion hole;
52: Flat surface;
53: Inner guide end surface;
54: Engagement recess;
55: Inner guide outer peripheral portion;
56: Flange part;
56A: Flange part end surface;
56B: Flange part outer peripheral surface;
57: Intermediate tubular part;
57A: Intermediate end surface;
57B: Intermediate tapered surface;
58: Tip end tubular part;
58A: Tip end inner peripheral surface;
60: Outer guide part;
61: Insertion hole;
62: Outer guide end surface;
63: Outer guide outer peripheral portion;
64: Abutment portion;
65: Outer spring;
66: Outer spring receiving part;
70: Optical plug;
71: Ferrule;
71A: Ferrule endface;
72: Connector housing;
72A: End surface;
72B: Inner wall surface;
72C: Abutment surface;
80: Optical adapter;
81: Adapter housing:
81B: Inner wall surface;
82: Sleeve holder end portion;
83: Latch claw;
90: Optical receptacle;
91: First optical receptacle;
92: Receptacle housing;
92A: Inner wall surface;
92B: Ferrule housing part;
92C: Abutment portion;
96: Second optical receptacle;
97: Receptacle housing;
97A: Inner wall surface;
97B: Ferrule housing part;
97C: Housing end surface.

The invention claimed is:

1. A cleaning tool that is configured to clean a ferrule endface of an optical connector, the cleaning tool comprising:
a tool body; and
an extension part that extends from the tool body and that comprises:
a head that presses a cleaning element onto the ferrule endface of the optical connector;
an inner guide part through which the head is inserted; and
an outer guide part through which the inner guide part is inserted, wherein
in a case where an inner side of a housing of the optical connector is larger than or equal to a size of the outer guide part, an outer peripheral portion of the outer guide part fits inside the housing of the optical connector and the outer peripheral portion of the outer guide part aligns the head with the ferrule endface of the optical connector, and
in a case where the inner side of the housing of the optical connector is smaller than the size of the outer guide part, an endface of the outer guide part abuts an end surface of the housing of the optical connector, the inner guide part moves to a front side with respect to the outer guide part, and the head contacts the ferrule endface of the optical connector.

2. The cleaning tool according to claim 1, wherein the optical connector is an optical receptacle.

3. The cleaning tool according to claim 2, wherein outer peripheral portion of the inner guide part comprises a flat surface.

4. The cleaning tool according to claim 3, wherein in a case where the inner side of the housing of the optical connector is larger than or equal to the size of the outer guide part, the relative movement is caused by pressing an end surface of the inner guide part toward the optical connector and onto the housing of the optical connector.

5. The cleaning tool according to claim 3, wherein
the extension part comprises a plug-side guide part in which the head is inserted, and
in a case where the inner side of the housing of the optical connector is smaller than the size of the outer guide part, the relative movement is caused by pressing an end surface of the plug-side guide part toward the optical connector and onto the housing of the optical connector.

6. The cleaning tool according to claim 1, 2, or 3, wherein
the extension part moves in a predetermined direction with respect to the tool body, and
the cleaning tool further comprises a feeding mechanism that utilizes relative movement between the tool body and the extension part to supply the cleaning element to the head and to collect the cleaning element on the head.

7. The cleaning tool according to claim 1, wherein
the extension part comprises a plug-side guide part in which the head is inserted, and
when cleaning an optical plug, an end surface of the plug-side guide part projects further toward the optical plug than an end surface of the head, and
when cleaning an optical adapter to which the optical plug is connected, the plug-side guide part retracts and the end surface of the head is exposed toward the optical adapter.

8. The cleaning tool according to claim 7, wherein an outer peripheral portion of the plug-side guide part guides the head with respect to a ferrule endface of the optical plug.

9. The cleaning tool according to claim 7 or 8, wherein a ferrule of the optical plug is inserted into the plug-side guide part.

10. The cleaning tool according to claim 7 or 8, wherein when cleaning the optical plug, the plug-side guide part is retracted by pressing the end surface of the plug-side guide part toward the optical plug and onto an abutment surface inside the connector housing of the optical plug.

11. The cleaning tool according to claim 7 or 8, wherein
the extension part moves in a predetermined direction with respect to the tool body, and
the cleaning tool further comprises a feeding mechanism that utilizes relative movement between the tool body and the extension part to supply the cleaning element to the pressing surface and to collect the cleaning element on the pressing surface.

12. The cleaning tool according to claim 11, wherein
the extension part further comprises an adapter-side guide part through which the plug-side guide part is inserted, and
when cleaning the optical plug, the relative movement is caused by pressing an end surface of the adapter-side guide part toward the optical plug and onto the connector housing of the optical plug.

13. The cleaning tool according to claim 7, wherein
the extension part further comprises an adapter-side guide part through which the plug-side guide part is inserted, and
when cleaning the optical adapter, a flat surface of an outer peripheral portion of the adapter-side guide part guides the head with respect to the ferrule endface of the optical plug connected to the optical adapter.

14. The cleaning tool according to claim 13, wherein when cleaning the optical adapter, the relative movement is caused by pressing an end surface of the adapter-side guide part toward the optical adapter onto a sleeve holder end portion of the optical adapter.

15. The cleaning tool according to claim 7 or 8, wherein the extension part further includes a plug-side spring that urges the plug-side guide part toward the optical plug.

* * * * *